(12) United States Patent
Galant

(10) Patent No.: US 11,412,864 B2
(45) Date of Patent: Aug. 16, 2022

(54) ANTI-THEFT PRODUCT DISPLAY SYSTEM

(71) Applicant: Compucage International Inc., Kleinburg (CA)

(72) Inventor: Steve N. Galant, Kleinburg (CA)

(73) Assignee: Compucage International Inc., Kleinburg (CA)

( * ) Notice: Subject to any disclaimer, the term of this patent is extended or adjusted under 35 U.S.C. 154(b) by 0 days.

(21) Appl. No.: 16/788,148

(22) Filed: Feb. 11, 2020

(65) Prior Publication Data
US 2021/0244201 A1    Aug. 12, 2021

(51) Int. Cl.
*A47F 5/08*    (2006.01)
*F16M 11/04*    (2006.01)
*E05B 73/00*    (2006.01)

(52) U.S. Cl.
CPC ........ *A47F 5/0861* (2013.01); *E05B 73/0082* (2013.01); *F16M 11/041* (2013.01); *F16M 2200/022* (2013.01); *F16M 2200/027* (2013.01)

(58) Field of Classification Search
CPC .......... E05B 73/0082; F16M 2200/027; Y10T 70/411; A47F 5/0861
See application file for complete search history.

(56) References Cited

U.S. PATENT DOCUMENTS

| | | | |
|---|---|---|---|
| 4,421,943 A | 12/1983 | Withjack | |
| 5,169,114 A | 12/1992 | O'neill | |
| 5,778,805 A | 7/1998 | Green | |
| 6,443,417 B2 * | 9/2002 | Galant | E05B 73/0082 248/553 |
| 6,865,914 B2 * | 3/2005 | Irgens | B60D 1/06 70/14 |
| 7,370,840 B1 * | 5/2008 | Deconinck | E05B 73/0082 248/316.1 |
| 7,866,623 B2 | 1/2011 | Lapman | |
| 8,387,937 B2 | 3/2013 | Ye | |
| 8,511,119 B2 * | 8/2013 | Mazzucchelli | E05B 73/0017 70/57.1 |
| 9,936,823 B2 | 4/2018 | Galant | |
| 10,051,980 B2 | 8/2018 | Galant | |
| 2002/0157431 A1 * | 10/2002 | Lurie | A47F 7/024 70/58 |
| 2007/0290115 A1 | 12/2007 | Meyer | |
| 2009/0266963 A1 * | 10/2009 | Marszalek | E05B 73/0082 248/316.1 |
| 2018/0279805 A1 * | 10/2018 | Galant | F16M 11/041 |
| 2021/0123268 A1 * | 4/2021 | Gulick, Jr. | F16M 11/041 |

\* cited by examiner

*Primary Examiner* — Bradley Duckworth
(74) *Attorney, Agent, or Firm* — Ridout & Maybee LLP

(57) ABSTRACT

An anti-theft mounting device for securing a component to a mounting surface is disclosed. The anti-theft mounting device includes a first counterpart, a second counterpart, and a fastener. The first counterpart, the second counterpart and the fastener are co-operatively configured such that the first counterpart and the second counterpart are configured for connection in a connected state such that a component-engager is established. The component-engager defines a component-receiving space including a component-engaging surface. While the first counterpart and the second counterpart are disposed in the connected state and the fastener is connected to the mounting surface, the first counterpart is connected to the second counterpart via at least the fastener, and the component-engager is connected to the mounting surface via at least the fastener.

22 Claims, 23 Drawing Sheets

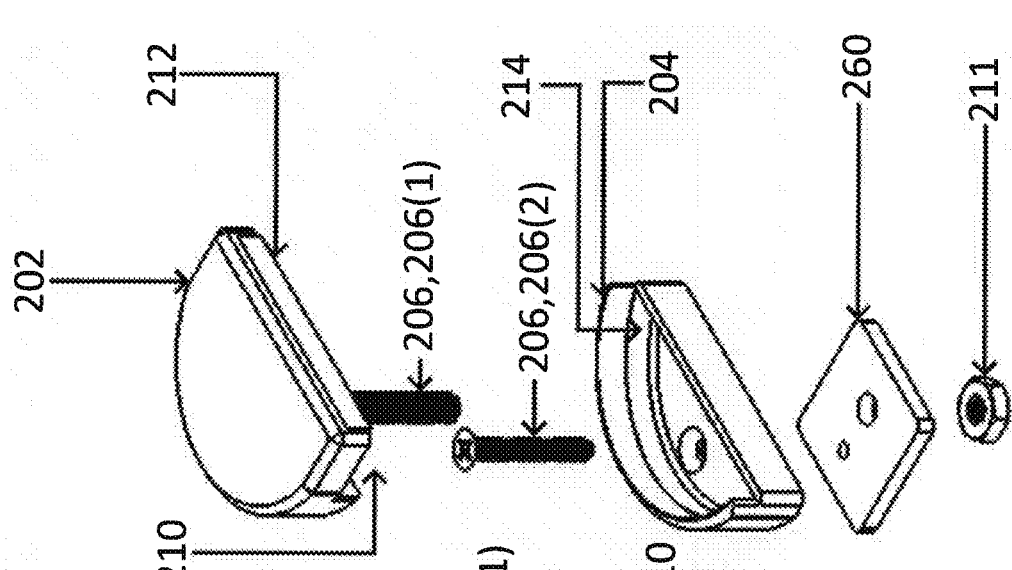
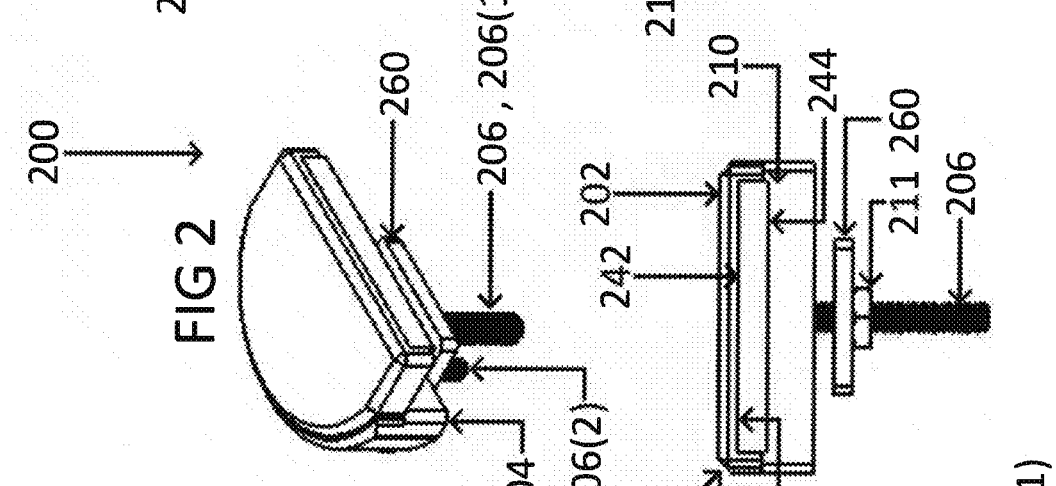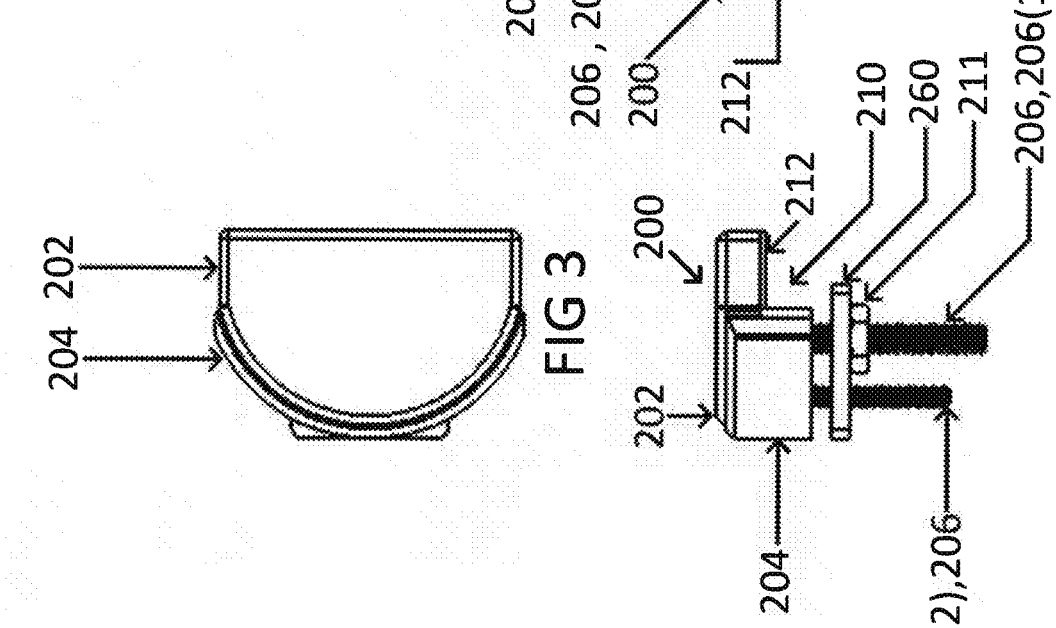

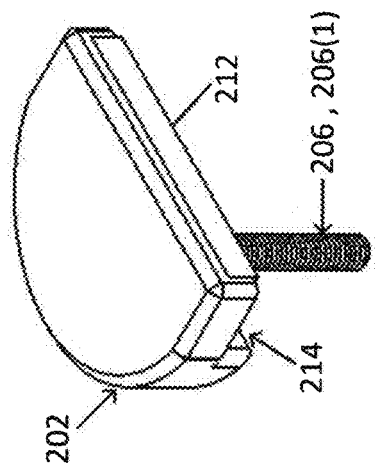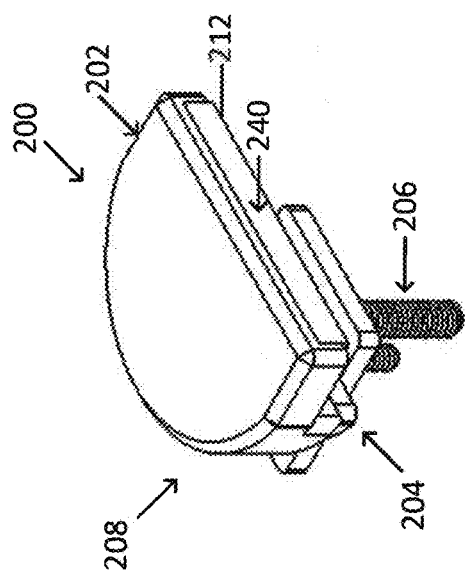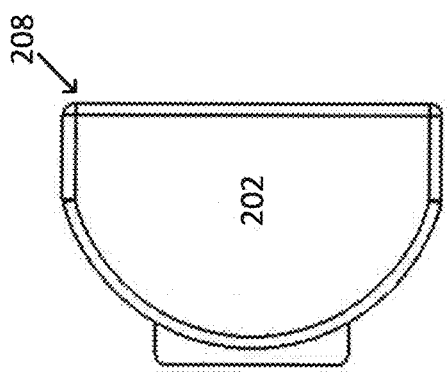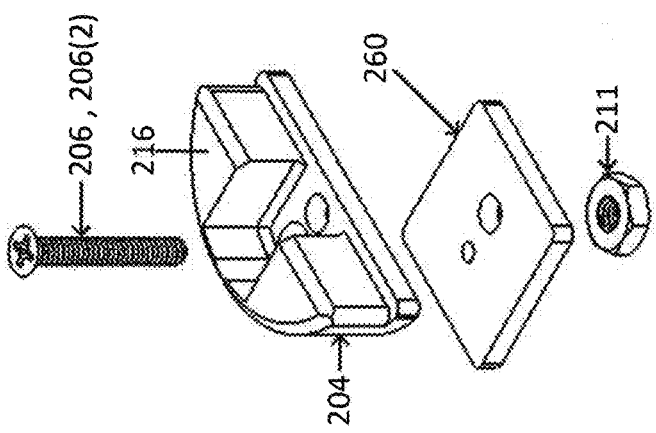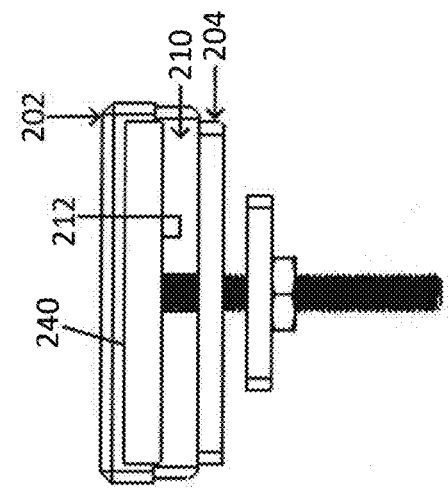

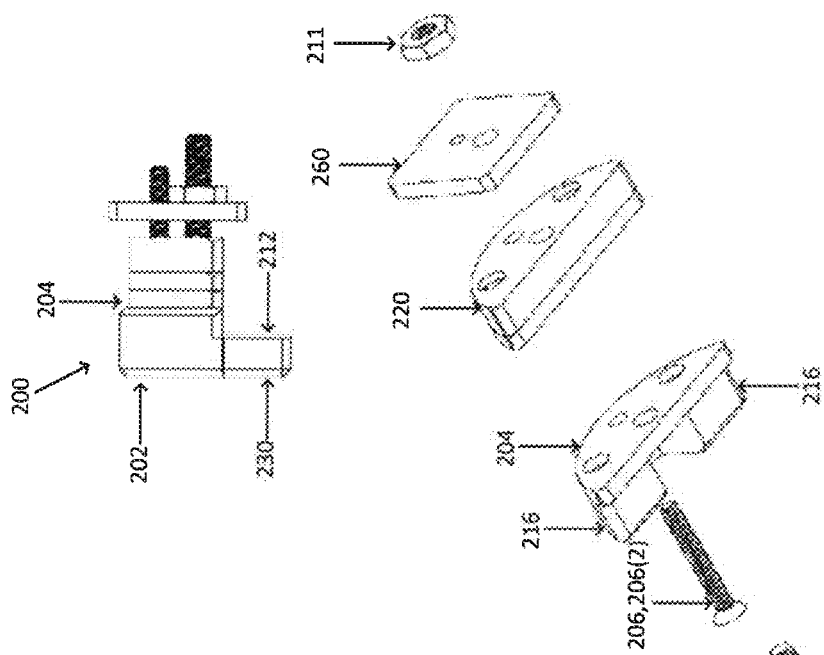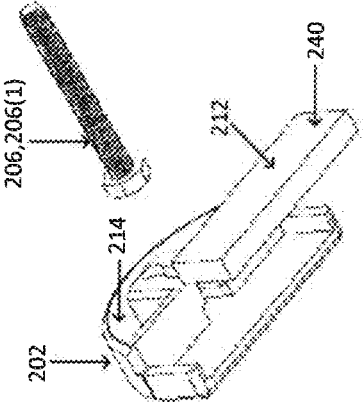

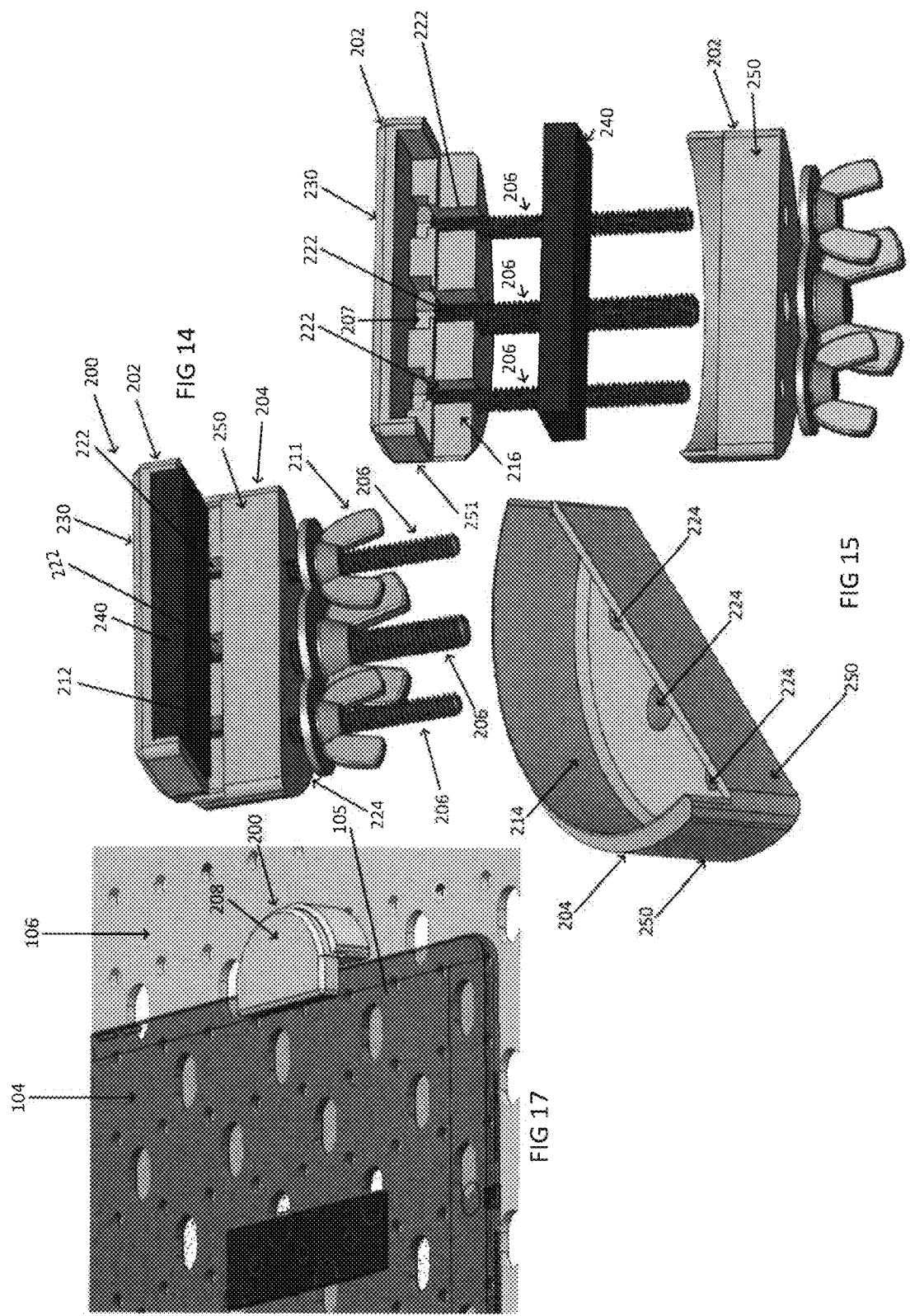

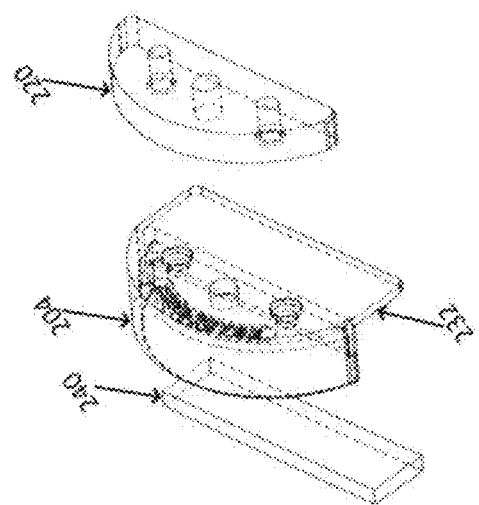
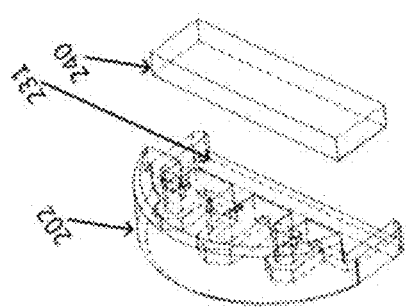
FIG 19 A

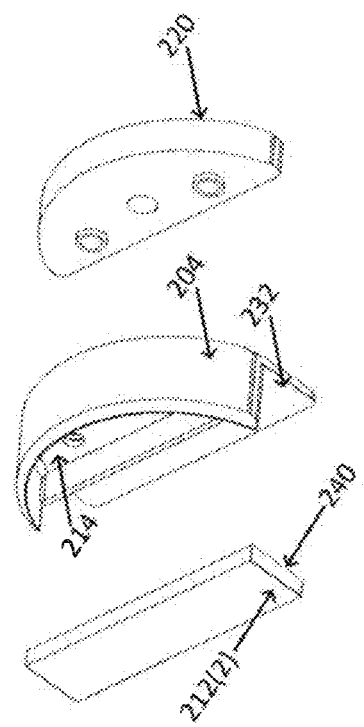
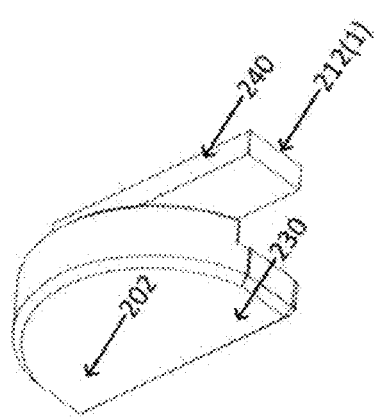
FIG 19 B

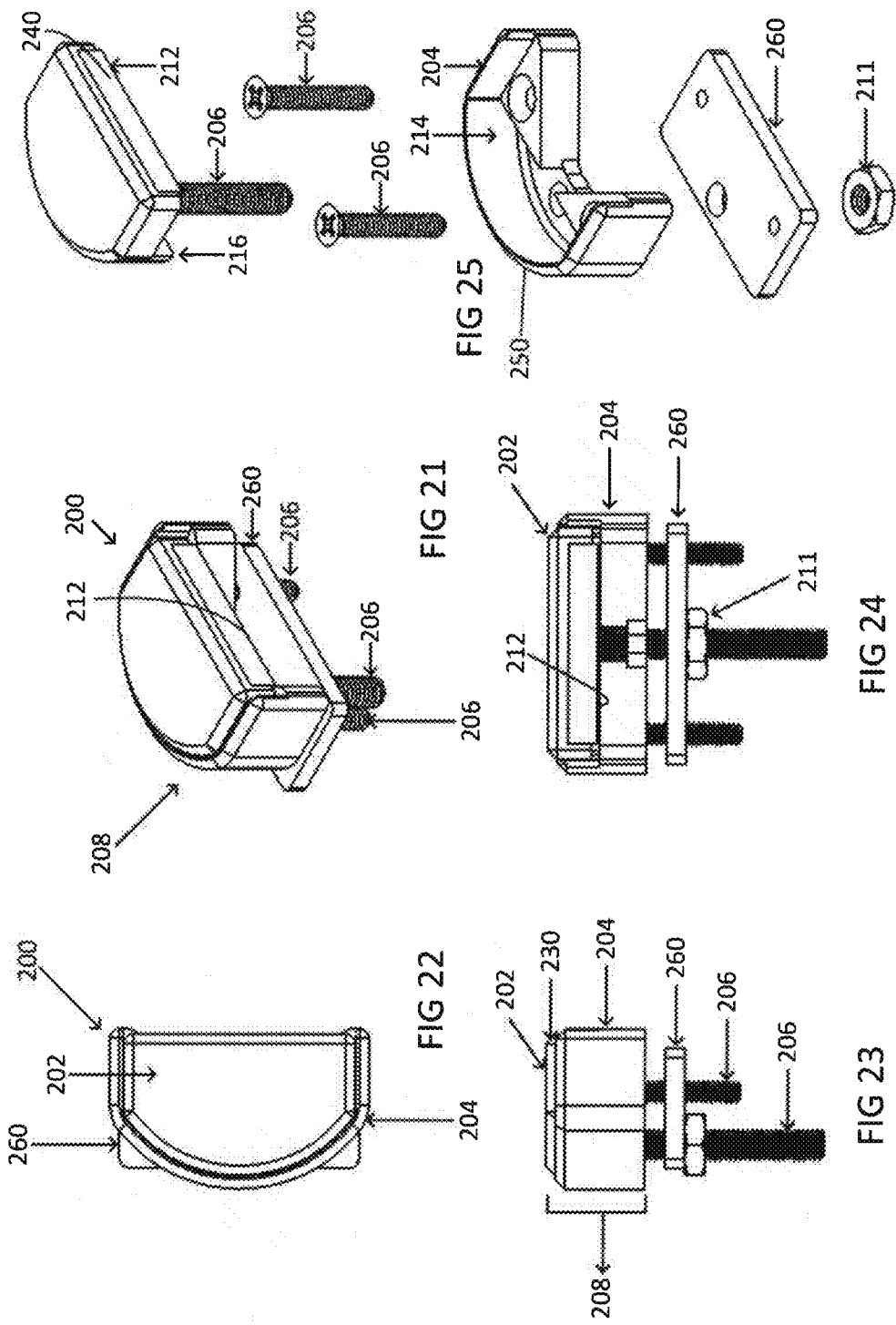

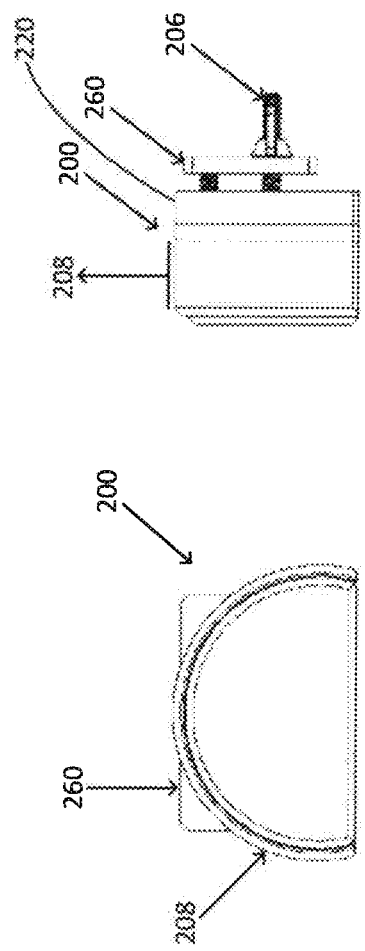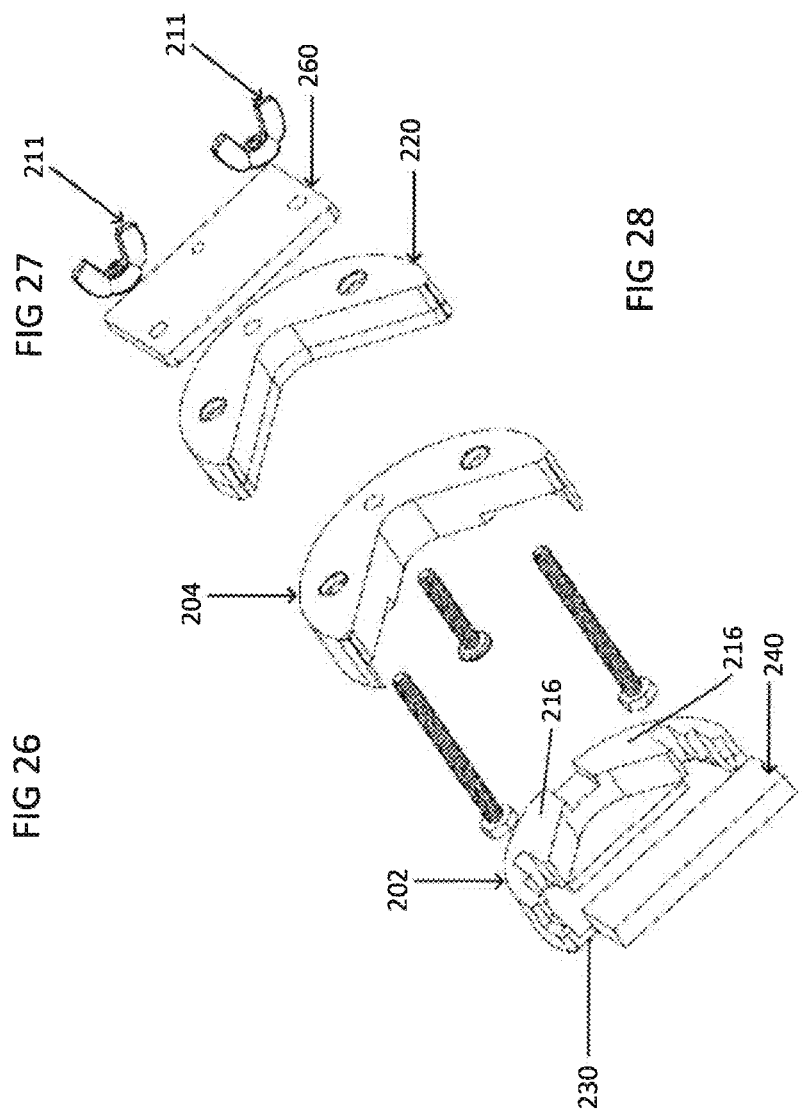

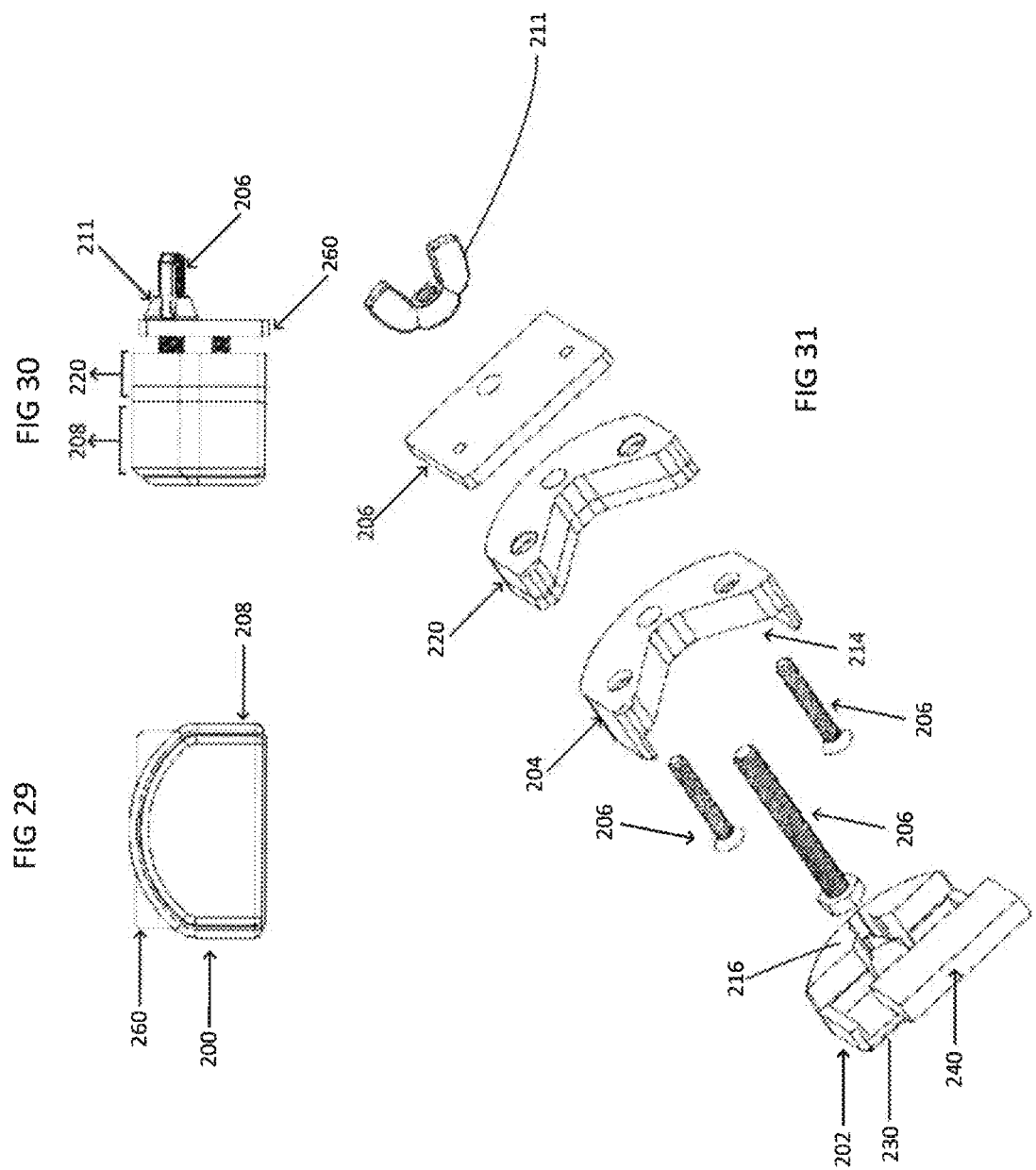

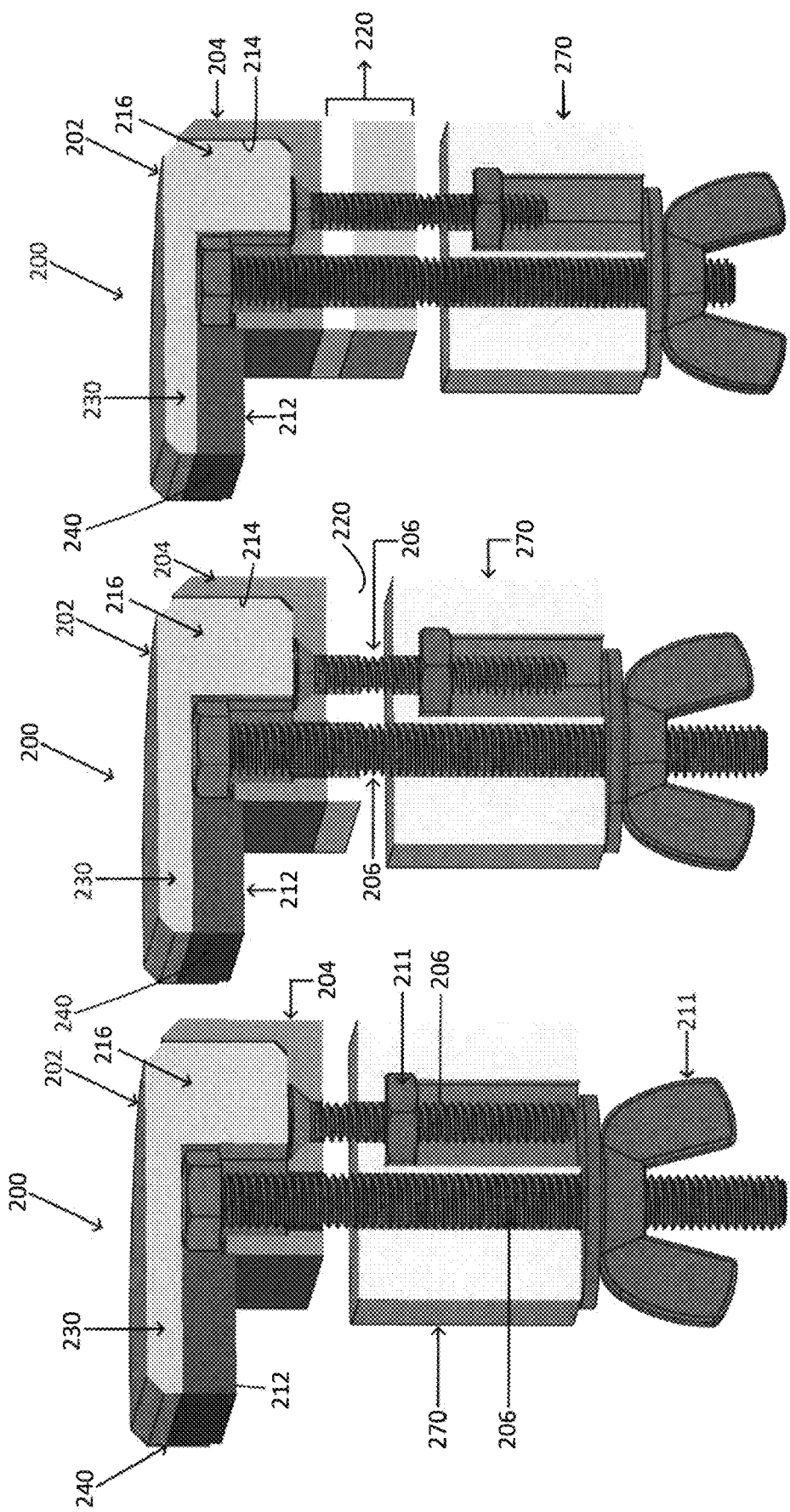

ANTI-THEFT PRODUCT DISPLAY SYSTEM

FIELD

This application relates to an anti-theft product display system and anti-theft devices for securely mounting products for display. More specifically, this application relates to an anti-theft product display system and devices for mounting components, in particular interactive components, in a secure manner for display or use.

BACKGROUND

Retailers who sell high theft risk components such as laptop computers, tablet computers and smart phones, for example, typically want to display sample products in a manner that prevents the unauthorized removal of products while at the same time minimizes interference with the user experience in viewing and interacting with the sample products. Additionally, retailers typically want to avoid permanent damage to or marking of the displayed products that would devalue the products.

Accordingly, anti-theft product display devices and systems that can be used independently to securely display interactive components and/or that can be used in conjunction with other known anti-theft product display devices or mounting systems to further enhance the secure mounting of high theft risk components are desirable.

SUMMARY

According to one aspect of the present disclosure, there is provided an anti-theft mounting device for securing a component to a mounting surface, the anti-theft mounting device comprising a first counterpart, a second counterpart, and a fastener. The first counterpart, the second counterpart and the fastener are co-operatively configured such that the first counterpart and the second counterpart are configured for connection in a connected state such that a component-engager is established, the component-engager defining a component-receiving space including a component-engaging surface. While the first counterpart and the second counterpart are disposed in the connected state and the fastener is connected to the mounting surface, the first counterpart is connected to the second counterpart via at least the fastener, and the component-engager is connected to the mounting surface via at least the fastener.

According to another aspect of the present disclosure, there is provided an anti-theft product display system for securely mounting a component, comprising: a mounting platform with one or more openings extending therethrough, and an anti-theft mounting device for securing the component to the mounting platform, the anti-theft mounting device comprising: a first counterpart, a second counterpart, and a fastener configured for insertion through any one of the one or more openings, wherein the first counterpart, the second counterpart and the fastener are co-operatively configured such that: the first counterpart and the second counterpart are configured for connection in a connected state such that a component-engager is established, the component-engager defining a component-receiving space including a component-engaging surface; and while the first counterpart and the second counterpart are disposed in the connected state and the fastener is inserted through the any one of the one or more openings and connected to the mounting platform, the first counterpart is connected to the second counterpart via at least the fastener; and the component-engager is connected to the mounting surface via at least the fastener.

According to another aspect of the present disclosure, there is provided an anti-theft mounting device for securing a component to a mounting surface, comprising: a first counterpart including a recess, a second counterpart including a protrusion, a cantilever portion defined by one of the first counterpart and the second counterpart, the cantilever portion defining a component-engaging surface disposed for contacting a surface of the component, and at least one fastener, wherein: the first counterpart and the second counterpart are cooperatively configured for connection in a nested configuration such that a component-engager is established, and while the first counterpart and the second counterpart are disposed in the nested configuration, and the component-engager is disposed such that the component-engaging surface is disposed for contacting the surface of the component, displacement of the cantilever portion away from the surface of the component is resisted via interference between the protrusion and the recess.

According to another aspect of the present disclosure there is provided a kit for an anti-theft product display system, comprising: a plurality of anti-theft mounting devices, wherein each one of the anti-theft mounting devices, independently, comprises: a first counterpart, a second counterpart, and at least one fastener, wherein the first counterpart, the second counterpart and the fastener are co-operatively configured such that: the first counterpart and the second counterpart are configured for connection in a connected state such that a component-engager is established, the component-engager defining a component-receiving space including a component-engaging surface; and while the first counterpart and the second counterpart are disposed in the connected state and the fastener is connected to the mounting surface: the first counterpart is connected to the second counterpart via at least the fastener; and the component-engager is connected to the mounting surface via at least the fastener.

BRIEF DESCRIPTION OF THE DRAWINGS

Reference will now be made, by way of example, to the accompanying drawings which show example embodiments of the present application, and in which:

FIG. 2 is a perspective, top view of an anti-theft mounting device for use in the system of FIG. 1 according to an example embodiment of the present disclosure;

FIG. 3 is a top view of the anti-theft mounting device of FIG. 2;

FIG. 4 is a side view of the anti-theft mounting device of FIG. 2;

FIG. 5 is a front view of the anti-theft mounting device of FIG. 2;

FIG. 6 is an exploded view of the anti-theft mounting device of FIG. 2;

FIG. 7 is a perspective, top view of another example embodiment of an anti-theft mounting device for use in the system of FIG. 1 according to the present disclosure;

FIG. 8 is a top view of the anti-theft mounting device of FIG. 7;

FIG. 9 is a side view of the anti-theft mounting device of FIG. 7;

FIG. 10 is a front view of the anti-theft mounting device of FIG. 7; and

FIG. 11 is an exploded view of the anti-theft mounting device of FIG. 7;

FIG. 12 is a side view of a variation of the anti-theft mounting device of FIG. 7;

FIG. 13 is an exploded view of the anti-theft mounting device of FIG. 12;

FIG. 14 is a perspective, front view of an anti-theft mounting device according to another example embodiment of the present disclosure;

FIG. 15 is a partially exploded view of the anti-theft mounting device of FIG. 14;

FIG. 16 is a perspective top view of a component of the anti-theft mounting device of FIGS. 14-15;

FIG. 17 is a detail view of the anti-theft mounting device of FIGS. 14-16 in use as part of the anti-theft product display system of FIG. 1;

FIG. 19A is an exploded, bottom perspective view of the anti-theft mounting device of FIG. 18;

FIG. 19B is an exploded top, perspective view of the anti-theft mounting device of FIG. 18;

FIG. 21 is a perspective view of an anti-theft mounting device according to an example embodiment of the present disclosure;

FIG. 22 is a top view of the anti-theft mounting device of FIG. 21;

FIG. 23 is a side view of the anti-theft mounting device of FIG. 21;

FIG. 24 is a front view of the anti-theft mounting device of FIG. 21;

FIG. 25 is an exploded view of the anti-theft mounting device of FIG. 21;

FIG. 26 is a top view of an anti-theft mounting device according to an example embodiment of the present disclosure;

FIG. 27 is a side view of the anti-theft mounting device of FIG. 26;

FIG. 28 is an exploded bottom view of the anti-theft mounting device of FIG. 26;

FIG. 29 is a top view of an anti-theft mounting device according to an example embodiment of the present disclosure;

FIG. 30 is a side view of the anti-theft mounting device of FIG. 29;

FIG. 31 is an exploded bottom view of the anti-theft mounting device of FIG. 29;

FIG. 36 is a cross-sectional side view of the anti-theft mounting device of FIG. 35 taken along section line A-A in FIG. 35;

FIG. 37 is an alternate embodiment of the mounting configuration shown in FIG. 36;

FIG. 38 is a further alternate embodiment of the mounting configuration of FIG. 36 with no spacer;

Similar reference numerals may have been used in different figures to denote similar components.

DESCRIPTION OF EXAMPLE EMBODIMENTS

This document describes example embodiments of an anti-theft product display system for mounting a component to a mounting surface. In some embodiments, for example, the anti-theft product display system is for mounting interactive components to a mounting surface. In some embodiments, for example, the anti-theft product display system is for mounting interactive components to a mounting surface or mounting component that, in turn, is mounted to an independent product display. The anti-theft product display system may, for example, be used in a retail location to secure a high theft risk component against unauthorized removal. The anti-theft product display system can also be used in other environments where multiple people will have access to the component, such as a public building, for example. In at least some embodiments, the anti-theft product display system described below secures a component while minimizing interference with access to and viewing of user interface elements of the component such as display screens, touch screens and keyboards. Additionally, in at least some embodiments, the anti-theft product display system does not interfere with venting air paths and/or component power or control buttons, and/or ports of the component. The anti-theft product display system is also configured to be installed on and removed from the component with little or no residual damage or marking to the component.

Figure 1:
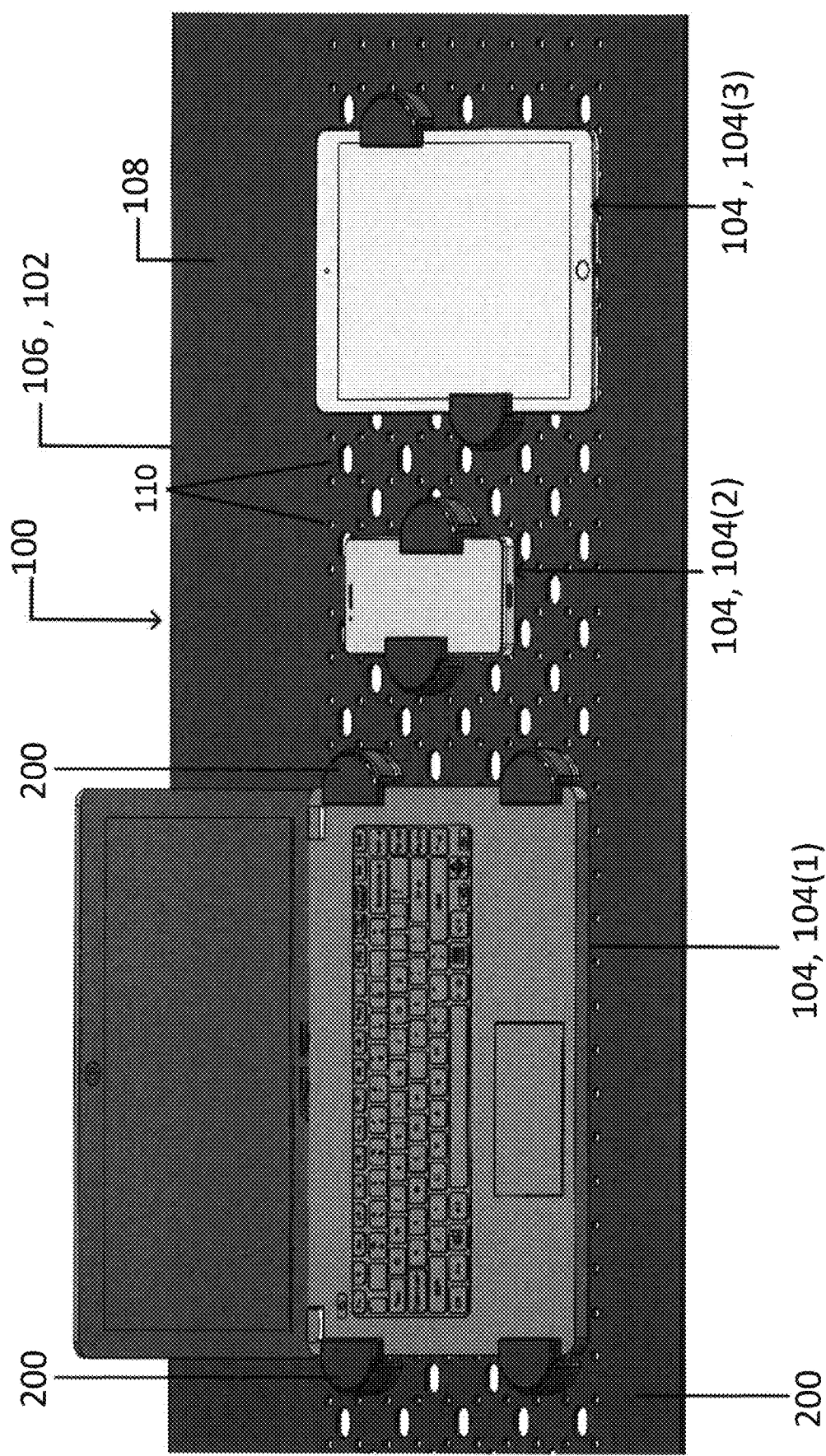
FIG. 1 is a perspective, top view of an anti-theft product display system according to example embodiments of the present disclosure in which the system is used to secure a variety of high theft risk components such as a laptop computer, a mobile communications device and a tablet.
Figure 6B:
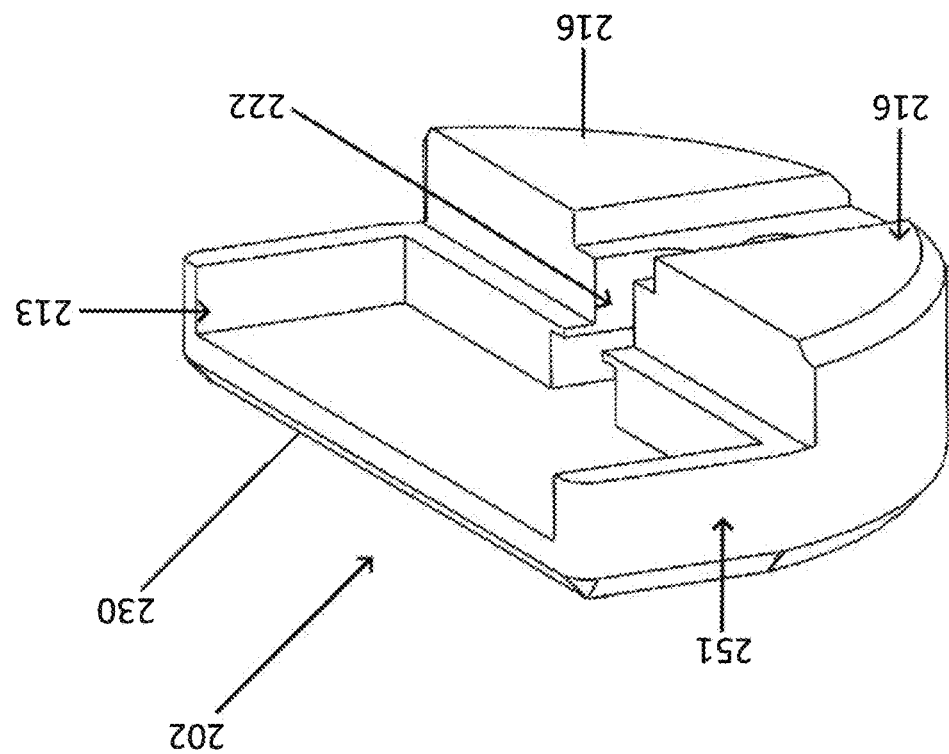
FIG. 6B is a perspective, bottom view of an alternate embodiment of a first counterpart of an anti-theft mounting device according to the present disclosure for mating with the second counterpart of FIG. 6A.
Figure 6A:
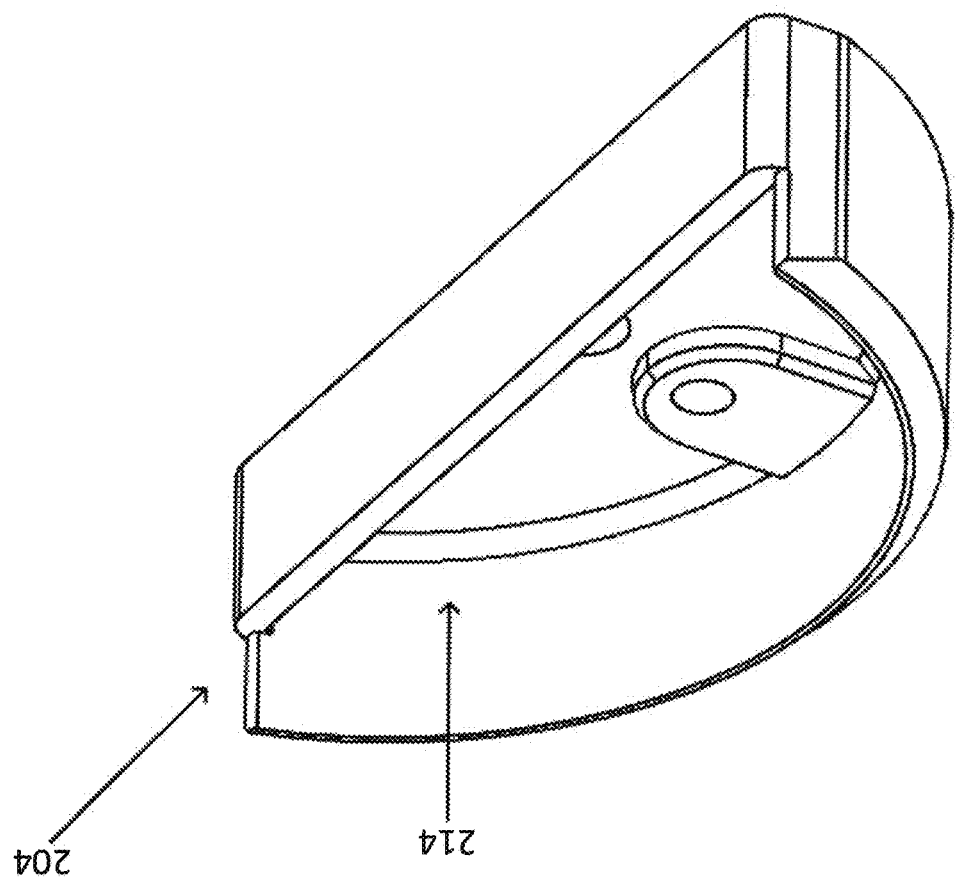
FIG. 6A is a perspective view of an alternate embodiment of a second counterpart of an anti-theft mounting device according to the present disclosure.

In this regard, FIG. 1 shows a perspective view of an anti-theft product display system 100 according to an example embodiment of the present disclosure in which the anti-theft product display system 100 is used to secure a high theft risk component 104 to a mounting platform 106. As shown in FIG. 1, the high theft risk component 104 may include, for example, a laptop computer 104(1), a smart phone 104(2) and a tablet 104(3). However, while FIG. 1 shows the anti-theft product display system 100 used in conjunction with interactive, electronic components such as laptop computers, smart phones and tablets, it will be understood that the anti-theft product display system 100 can be used to secure a variety of different types of components 104, including but not limited to, for example, portable keyboards, GPS devices, media players and the like, as well as other non-electronic components.

Figure 40:
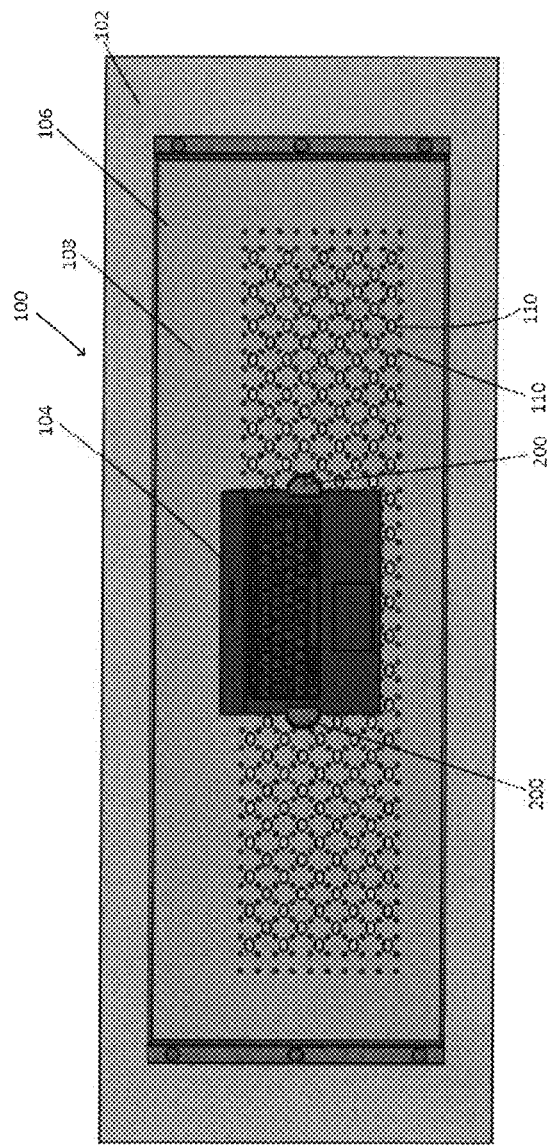
FIG. 40 is a top view of the anti-theft product display system according to an example embodiment of the present disclosure in which the high theft risk component is securely mounted on mounting surface which, in turn, is mounted to an independent product display platform.
Figure 41:
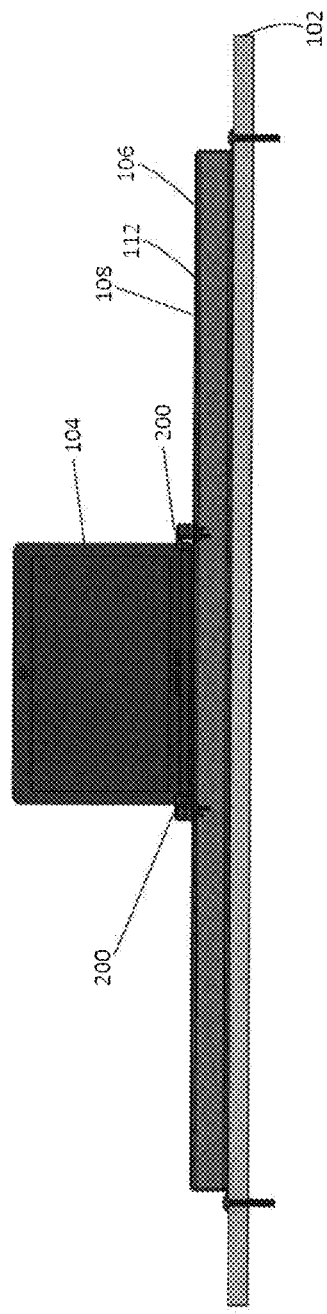
FIG. 41 is a front view of the example embodiment of FIG. 40.
Figure 42:
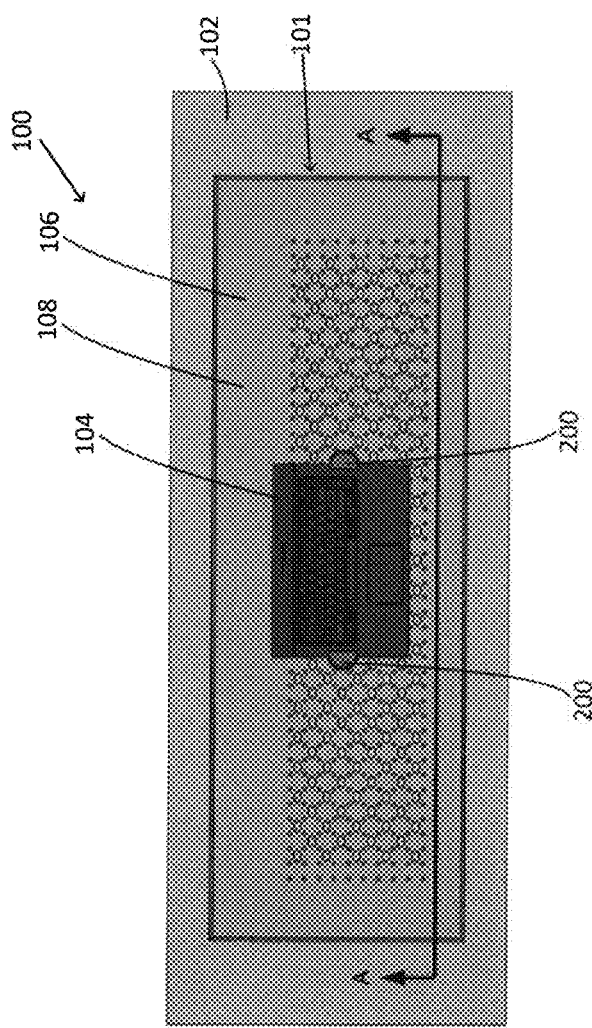
FIG. 42 is a top view of the anti-theft product display system according to an example embodiment of the present disclosure in which the high theft risk component is securely mounted on hinged mounting surface which is part of mounting box or cabinet, in turn, is mounted to an independent product display platform.
Figure 43:
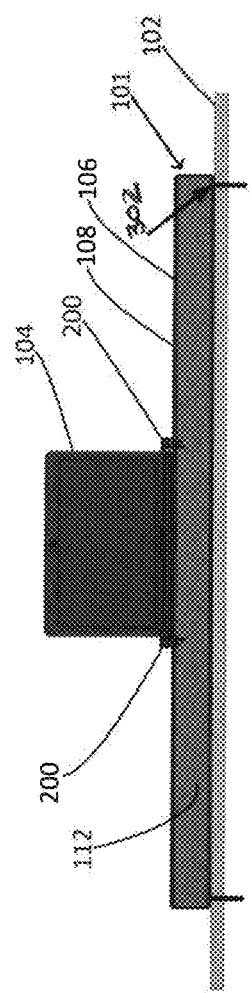
FIG. 43 is a cross-sectional view of the anti-theft product display system taken along section line AA in FIG. 42.
Figure 44:
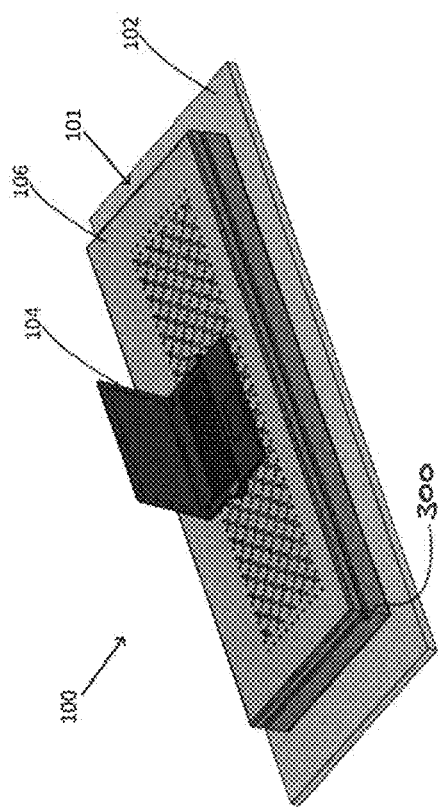
FIG. 44 is a perspective view of the anti-theft product display system of FIG. 42.
Figure 45:
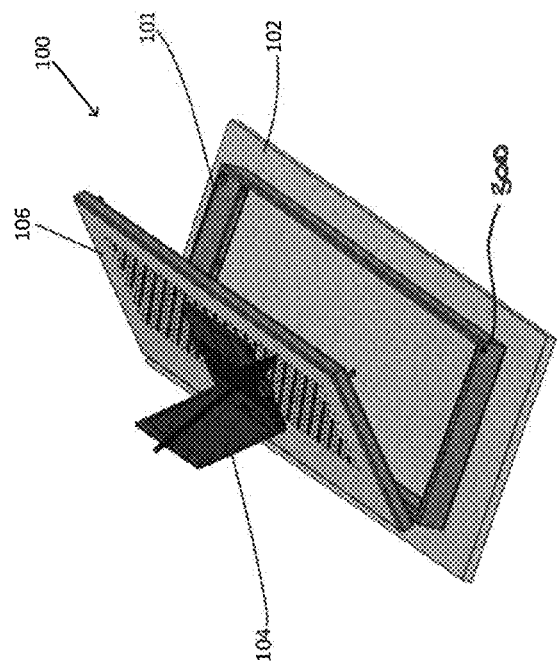
FIG. 45 is a top, perspective view of the anti-theft product display system illustrating the open condition of the mounting box or cabinet.
Figure 46:
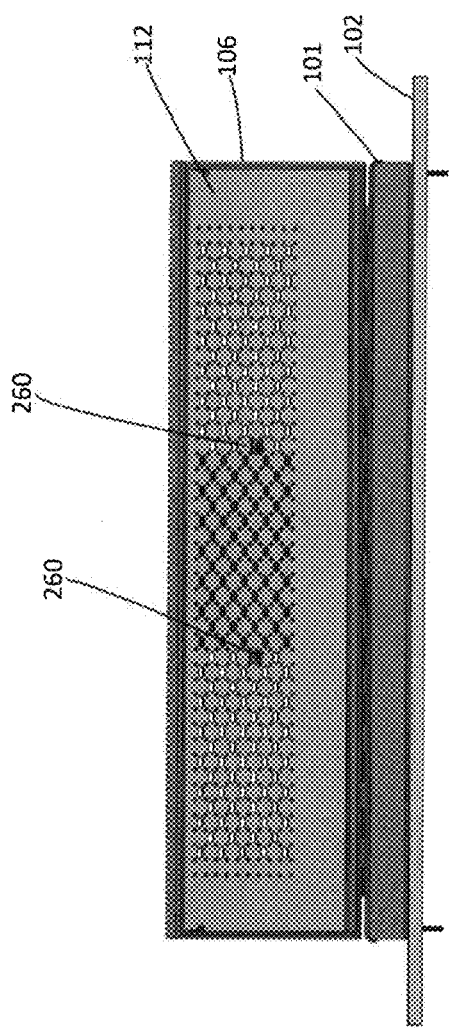
FIG. 46 is a front view of the anti-theft product display system as shown in FIG. 45 illustrating the underside of the mounting surface.
Figure 47:
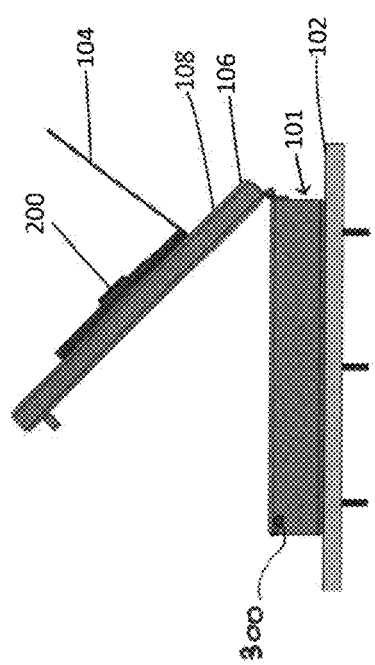
FIG. 47 is a side view of the anti-theft product display system as shown in FIG. 45.

In some embodiments, for example, the mounting surface 106 is part of an integrated mounting platform 102, or a counter or table in a retail setting. In other embodiments, for example, the mounting surface 106 is configured for mounting to a separate mounting platform 102 that is part of a counter or table in a retail setting, and is independent to the mounting surface 106, as shown for instance in FIGS. 40-41, the mounting surface 106 being secured to the mounting platform 102 via fasteners or any other suitable fastening device. In some embodiments, for example as shown in FIGS. 42-47, the mounting surface 106 may include hinges and serve as an access panel or door to a locked cabinet, or box, or locked display table or mounting component 101, which can open providing access to the backside of the mounting surface 106 or the underside of a display table. In such instances, the mounting surface 106 serves as the door or access panel which can be locked in a closed position via any suitable locking device 300. In such embodiments, for example, the fasteners or fastening devices 302 used to securely mount the mounting component 101 to the mounting platform 102 can be concealed within the mounting component 101 so as not to be visible on the mounting platform 102.

Whether the mounting surface 106 is part of an integrated mounting platform 102 or is configured for mounting to a separate mounting platform 102, or forms part of a mounting component (or box or cabinet) 101, the mounting surface 106 defines a support surface 108 with one or more openings 110 extending through the support surface 108 to a bottom surface 112 of the mounting surface 106 that is not visible in FIG. 1. In some embodiments, for example, the support surface 108 is planar, or substantially planar. In some embodiments, for example, the one or more openings 110 includes a longitudinal slot, while in other embodiments, for example, the one or more openings 110 include a plurality of mounting holes arranged in an array of rows and columns. In some embodiments, for example, the one or more openings 110 includes a combination of one or more longitudinal slots and one or more mounting holes.

Referring now to FIGS. 2-6, there is shown an example embodiment of an anti-theft mounting device 200 for use in the anti-theft product display system 100. The anti-theft mounting device 200 is configured for securing a component 104 to the mounting surface 106. As shown, the anti-theft mounting device 200 includes a first counterpart 202, a second counterpart 204, and at least one fastener 206. The first counterpart 202, the second counterpart 204 and the fastener 206 are co-operatively configured such that the first counterpart 202 and the second counterpart 204 are configured for connection in a connected state such that a component-engager 208 is established.

As shown, the component-engager 208 includes a cantilever portion 230 that is configured for engaging or contacting, for example, an upper surface 105 of the component 104 to be secured. Accordingly, the component-engager 208 defines a component-engaging surface 212 and is configured for defining a component-receiving space 210 such that disposition of at least a portion of the component 104 within the component-receiving space 210 is such that the component-engaging surface 212 is disposed in contact with, or substantial contact with, the upper surface 105 of the component 104. Accordingly, with reference, for example, to FIG. 4, while the first counterpart 202 and the second counterpart 204 are disposed in the connected state and the fastener 206 is connected to the mounting surface 106 (not shown), the first counterpart 202, the second counterpart 204 and the fastener 206 are co-operatively configured such that the first counterpart 202 is connected to the second counterpart 204 via at least the fastener 206, and the component-engager 208 is connected to the mounting surface 106 via at least the fastener 206. In the subject example, embodiment, once the component-engager 208 is connected to the mounting surface 106 via at least the fastener 206, the component-receiving space 210 is defined between the component-engaging surface 212 and the corresponding upper surface 108 of the mounting surface 106. Accordingly, in some embodiments, the component-receiving space 210 defines a gap between the component-engager 208 and the mounting surface 106 having a height, H, defined between the component-engaging surface 212 and the support surface 108 of the mounting surface 106.

Figure 18:
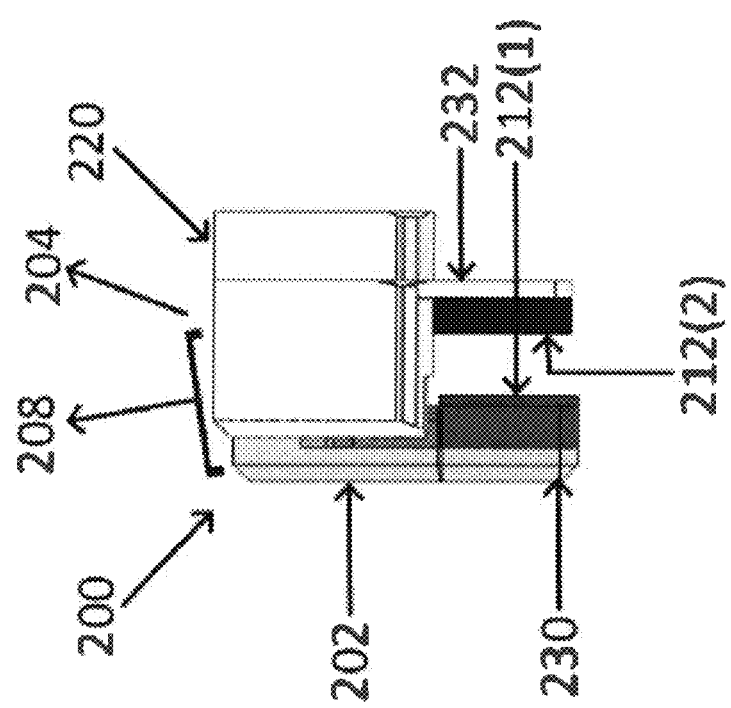
FIG. 18 is a side view of an anti-theft mounting device according to another example embodiment of the present disclosure.
Figure 20:
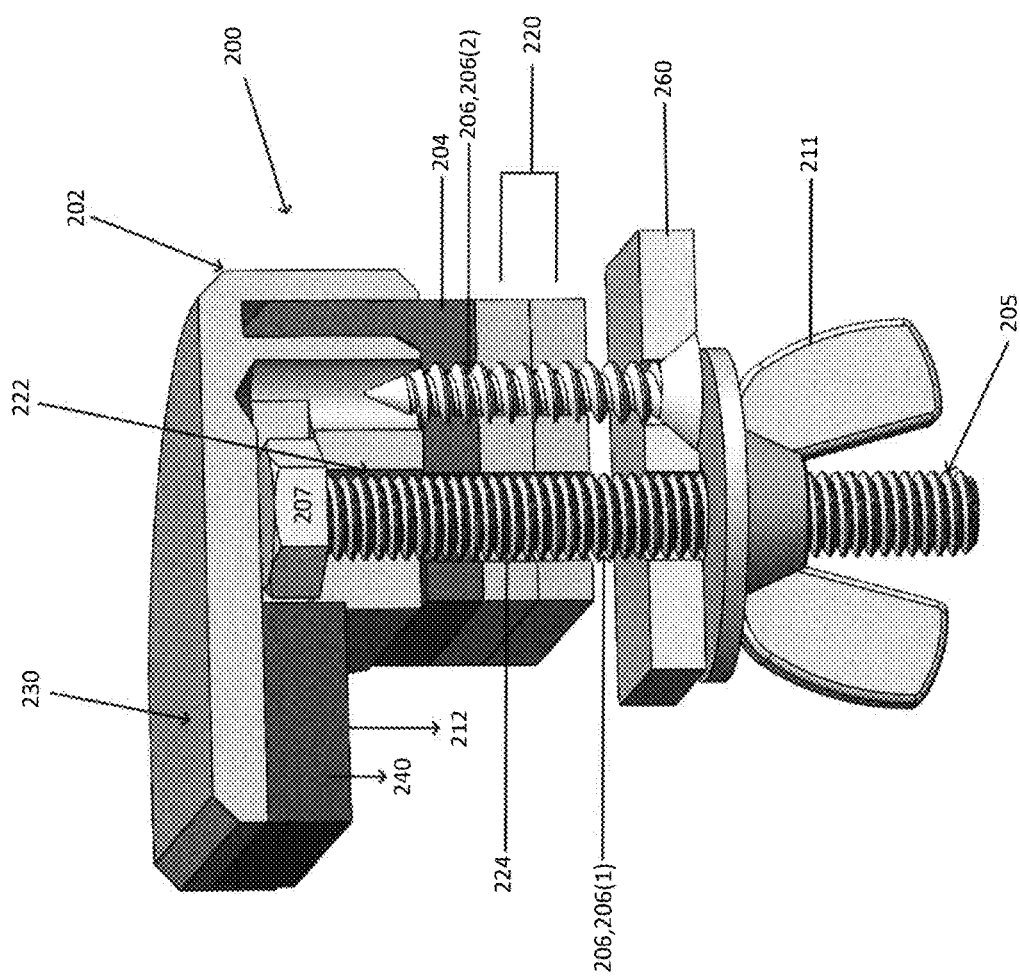
FIG. 20 is a sectional, side view of an example embodiment of an anti-theft mounting device according to the present disclosure.

In other embodiments, for example, see for instance the example embodiment shown in FIGS. 18, 19A-19B, the component-engager 208 includes a bottom edge portion 232 that extends away from the base or bottom portion of the component-engager 208. In the subject example embodiment, the bottom-edge portion 232 extends away from the base or bottom portion of the second counterpart 204 such that, while the component-engager 208 is established, the bottom edge portion 232 extends spaced-apart from the cantilever portion 23 along an axis that is parallel to, or substantially parallel to the axis along which the stacked relationship of the first and second counterparts 202, 204 is defined. Accordingly, in the subject example embodiment, the cantilever portion 230 defines a first component-engaging surface 212(1) while the bottom edge portion 232 defines a second component-engaging surface 212(2) for contacting or engaging a corresponding bottom surface 107 of the component 104 to be secured. Therefore, in the example embodiment illustrated in FIGS. 18, 19A-19B, while the first counterpart 202 and the second counterpart 204 are disposed in the connected state such that the component-engager 208 is established, the component-receiving space 210 is defined between the cantilever portion 230 and the bottom edge portion 232 of the component-engager 208. Accordingly, in some embodiments, the component-receiving space 210 defines a gap having a height, H, that is defined between the first component-engaging surface 212(1) defined by the cantilever portion 230 of the component-engager 208 and the second component-engaging surface 212(2) defined by the bottom edge portion 232 of the component-engager 208.

While the example embodiment illustrated in FIGS. 18, 19A-19B show the second component-engaging surface 212(2) as extending parallel, or substantially parallel, to the first component-engaging surface 212(1) defined by the cantilever portion 230 of the component engager 208, it will be understood that other configurations are contemplated within the scope of the present disclosure. More specifically, in some embodiments, for example, the second component-engaging surface 212(2) is shaped to correspond to the profile of a component 104 to be secured. For example, some high theft risk interactive electronic components 104 such as laptops and tablets provide a generally planar upper surface 105 while the outer edge of the component 104 includes surfaces that are sloped, or curved, or tapered towards the base or bottom surface of the component 104. Therefore, in order to ensure a proper-fit between the component engager 208 and the component 104 the second component-engaging surface 212(2) is configured to correspond to the outer and/or bottom edge of the component 104. Other high theft risk interactive electronic components may include sloped or shaped upper edge surfaces as well in which case the first component-engaging surface 212(1) may also be shaped to correspond to the device or component 104 that is to be secured. Accordingly, in example embodiments wherein the component-engager 208 includes first and second component-engaging surfaces 212(1), 212(2) it will be understood that the first and second counterparts 202, 204 are cooperatively configured such that the component-receiving space 210 defined between the first and second component-engaging surfaces 212(1), 212(2) is configured to cooperate with and/or accommodate the component 104 that is to be secured to the mounting surface 106.

In some embodiments, for example, the component-engager 208 is configured such that the cantilever portion 230 defines a recess 213 that is configured for receiving a flexible member 240 such that the component-engaging surface 212 is defined by a surface of the flexible member 240. The flexible member 240 serves to provide a degree of cushioning between cantilever portion 230 of the component-engager 208 and the component 104. In some embodiments, for example, the flexible member 240 includes a first surface 242 configured for adhering to the underside 231 of the cantilever portion 230 and a second surface 244 configured for adhering to the upper surface 105 of the component 104 to be secured. In some instances, the flexible member 240 also serves as an insulator between the component engager 208 and the component 104 to help prevent heat generated by the component 104 from being transferred to the anti-theft mounting device 200, which in some instances, may be made of a metal material. The second surface 244 that is configured for adhering to the upper surface 105 of the component 104 includes an adhesive that is resistant to shearing forces which prevents the component 104 from sliding relative to the component engager 208 if subjected to forces applied in the plane of connection between the component 104 and the mounting surface 106 and the plane of connection between the component 104 and the component engager 208. While the adhesive is resistant to shearing forces and/or forces applied in the shearing direction, the adhesive is capable of being removed from the surface 105 of the component 104 without permanent damage to the surface itself once the component 104 has been removed from the anti-theft mounting device 200 by an authorized user.

In some embodiments, for example, the anti-theft mounting device 200 is configured such that the first counterpart 202 and the second counterpart 204 are co-operatively configured for connection in a nested configuration. More specifically, in some embodiments, for example, one of the first and second counterparts 202, 204 includes a recess 214, while the other one of the first and second counterparts 202, 204 includes a protrusion 216 such that disposition of the first counterpart 202 and the second counterpart 204 in the nested configuration is such that the protrusion 216 is disposed within the recess 214 such that the component-engager 208 is established.

Referring again to the example embodiment illustrated in FIGS. 2-6, the first counterpart 202 includes a protrusion 216 while the second counterpart 204 includes a recess 214. However, it will be understood that in other example embodiments, the first counterpart 20 may include a recess 214 while the second counterpart 204 includes a protrusion 216. Referring, for example, to FIGS. 7-11, there is shown an example embodiment of the anti-theft mounting device 200 wherein the first counterpart 202 includes a recess 214 while the second counterpart 204 includes a protrusion 216. Accordingly, in some embodiments, when the first and second counterparts 202, 204 are disposed in a nested configuration, the protrusion 216 on the second counterpart 204 is disposed within the recess 214 provided on the first counterpart 202.

Furthermore, it will be understood that, while the example embodiments illustrated in FIGS. 2-6 and FIGS. 7-11 show the first counterpart 202 as being the top or upper portion of the component engager 208 with the second counterpart 204 forming the base or bottom portion of the component engager 208, in some example embodiments, the first counterpart 202 may be the base or bottom portion of the component-engager 208 while the second counterpart 204 may be the top or upper portion of the component-engager 208 with the second counterpart 204 defining the cantilever portion 230, for example.

In example embodiments wherein the secure mounting device 200 includes a first counterpart 202 and a second counterpart 204 that are connected in a nested configuration, the nested configuration is such that the first counterpart 202 and the second counterpart 204 are displaceable relative to one another, as the protrusion 216 slides within the recess 214 to provide a degree of adjustability to the component engager 208. More specifically, it will be understood that, for the case of interactive electronic components, such as laptops, tablets, smartphones, etc., the various components 104 intended to be secured using the anti-theft product display system 100 will often have varying heights, or varying overall thicknesses. Accordingly, the anti-theft mounting device 200 used for securely mounting a laptop computer 104(1) to the mounting surface 106 will often require a component-engager 208 with a component-receiving space 210 that defines a gap having a height, H, that is greater than, for example, the height, H, of the component-engaging space 210 defined by the component engager 208 of the anti-theft mounting device 200 that is used for securely mounting a tablet, or smart phone. Accordingly, in some embodiments, for example, it will be understood that the first and second counterparts 202, 204 are each, independently provided with corresponding sliding surfaces. In some embodiments, the corresponding sliding surfaces are established by an outer wall defined by the recess 214 and the outer surface of the protrusion 216.

Therefore, in some embodiments, for example, the nested configuration provided by the mating engagement of the first and second counterparts 202, 204 is such that the first counterpart 202 and the second counterpart 204 are cooperatively configured for connection in a plurality of connected states wherein, for each one of the plurality of connected states, independently, the first counterpart 202 and the second counterpart 204 are disposed in a nested configuration such that a component-engager 208 is established, and while the component engager 208 is disposed on the mounting surface 106 and the fastener 206 is connected to the mounting surface 106, the component-engager 208 is connected to the mounting surface 106, via at least the fastener 206, such that a component-receiving space 210 is defined between the component-engaging surface 212 and the mounting surface 106, wherein the component-receiving space 210, for each one of the plurality of connected states, independently, defines a gap having a height, H, specific to a corresponding one of the plurality of connected states.

More specifically, in some embodiments, for example, the first and second counterparts 202, 204 are configured for connection in, at least, a first state and a second state such that: (i) in the first state, while the first counterpart 202 is connected to the second counterpart 204 by at least the fastener 206 and the fastener 206 is connected to the mounting surface 106, the component-engager 208 defines a first component-receiving space 210 having a first height, H1, and (ii) in the second state, while the first component 202 and the second component 204 are connected by at least the fastener 206 and the fastener 206 is connected to the mounting surface 106, the component-engager 208 defines a second component-receiving space 210(2) having a second height, H2, wherein the second height, H2, is greater than the first height, H1.

In some embodiments, for example, in order to achieve the specific height adjustment required for securing a particular component 104 to the mounting surface 106, the anti-theft mounting device 200 includes one or more spacers 220 that are configured for disposition in a stacking relationship with the first counterpart 202 and the second counterpart 204 so as to further space apart the component-engaging surface 212, defined by the component engager 208, from the mounting surface 106.

In some embodiments, for example, the spacer 220 is configured for disposition intermediate the first counterpart 202 and the second counterpart 204. Accordingly, in some embodiments, one or more spacers 220 are configured for disposition within the recess 214 defined by either the first counterpart 202 or the second counterpart 204. In other embodiments, for example, the spacer 220 may be disposed or otherwise stacked underneath the component engager 208 so as to further space the component-engaging surface 212 away from the corresponding mounting surface 106. See, for instance, the embodiments shown in FIGS. 13, 19, 20, 28, and 31 wherein a spacer 220 is disposed underneath the second counterpart 204.

Figure 32:
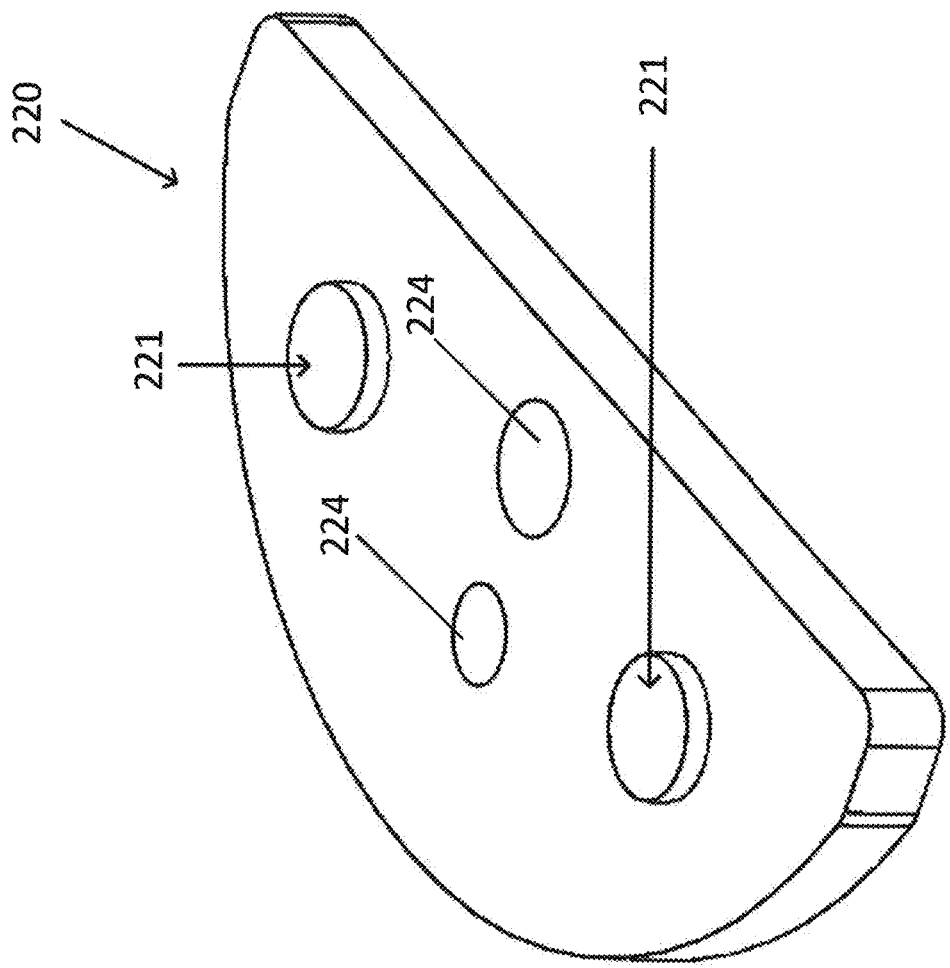
FIG. 32 is a detail perspective view of an example embodiment of a spacer for use with anti-theft mounting device according to the example embodiments of the present disclosure.
Figure 33:
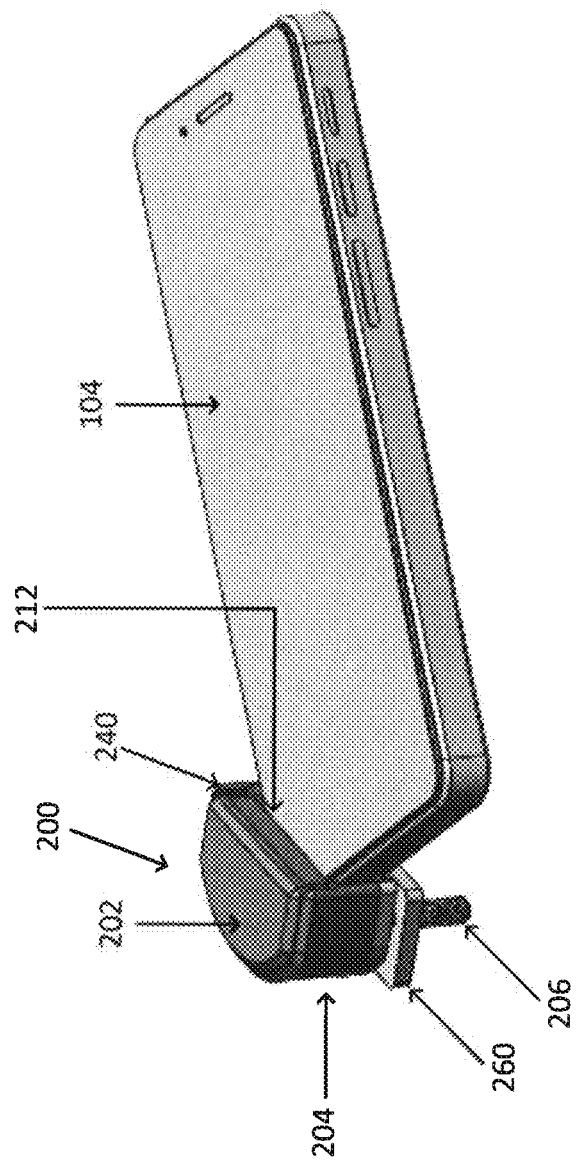
FIG. 33 is a perspective view of an anti-theft mounting device according to an example embodiment of the present disclosure that is configured for engaging a corner of a component that is to be secured.

In some embodiments, for example, in order to assist with alignment of the one or more spacers 220 with either the first or second counterpart 202, 204 such that the first counterpart, the second counterpart 204 and the spacer(s) 220 become disposed in a stacked relationship, the spacer(s) 220 include locating features 221 configured for engaging or mating with corresponding locating features 223 disposed on the corresponding surface of the corresponding first or second counterpart 202, 204 against which the spacer 220 is stacked. In some embodiments, for example, the locating features 221 include protrusions as shown, for example in FIG. 32. In some embodiments, the locating features 221, 223 include corresponding male and female counterparts. In some embodiments, for example, the locating features 221, 223 are disposed in alignment with the component-engager 208 via stacking while in other embodiments they are disposed in alignment with the component-engager 208 via a sliding configuration.

In use, in order to secure a component 104 to the mounting surface 106, two or more of the anti-theft mounting devices 200 are positioned at spaced apart intervals about the perimeter of the component 104 (as shown for instance in FIG. 1 and FIGS. 40-47). As the anti-theft mounting devices 200 are fastened, or otherwise secured, to the mounting surface 106, in some embodiments, a clamping force is applied to the component 104 by at least downward forces applied by the cantilever portion 230 against the component 104. In embodiments wherein the component-engager 208 includes both a first component-engaging surface 212(1) and a second component-engaging surface 212(2), forces may be applied by both the cantilever portion and the bottom edge portion 232 of the component-engager 208 that define the component-receiving space. The forces applied by the individual anti-theft mounting devices 200 at various locations about the perimeter of the component 104 and the secure connection between the anti-theft mounting device 200 and the mounting surface 106 serve to resist and/or prevent unwarranted removal of the component 104 from the mounting surface 106. More specifically, by having the cantilever portion 230 of the component-engager 208 of the various anti-theft mounting devices 200 that are positioned about the perimeter of the component 104 extend over the top surface of the component 104 while the anti-theft mounting devices 200 themselves are securely fastened to the mounting surface 106 prevents removal of the component 104 in an upwards direction away from the mounting surface 106. When the component-engagers 208 are further equipped with the flexible member 240 which includes suitable adhesive layers, sliding of the component 104 relative to the anti-theft mounting devices 200 is also prevented, as described above.

In some embodiments, for example, the secure mounting devices 200 may be used in conjunction with additional secure mounting devices and/or secure mounting systems such as, for example, the secure mounting devices disclosed in U.S. Pat. No. 10,051,980, the contents of which is incorporated herein by reference.

In example embodiments wherein the anti-theft mounting devices 200 are used for securing interactive, electronic components such as tablets and smart phones, for example, the component-engaging surface 212 defined by the cantilever portion 230 of the component engager 208 is disposed for contacting the upper surface 105 of the components 104, which often defines the screen of the component 104. In order to mitigate pressure points and mitigate the application of a downwards force that may exceed the tolerance of the screen that could result in cracking or other damage to the screen surface, as described above, in some embodiments, the cantilever portion 230 is configured for receiving a flexible member 240, the flexible member 240 being disposed on the underside of the cantilever portion 230, the flexible member 240 and the cantilever portion 230 being co-operatively configured such that the flexible member 240 defines the component-engaging surface 212.

In some embodiments, for example, the flexible member 240 includes a first surface 242 configured for adhering to the underside 231 of the cantilever portion 230 and a second surface 244 configured for adhering to the upper surface 105 of the component 104 to be secured. In some embodiments, for example, the flexible member 240 includes a strip of double-sided tape. By way of non-limiting example, a commercially available tape is Duraco High Bond® Tape, which is a high performance acrylic foam core tape that is tamper resistant, effective for bonding dissimilar metals, and resistant to temperature cycles. However, it will be understood that any suitable adhesive tape strip or adhesive flexible member can be used provided that it provides the required degree of cushioning and/or flexibility to mitigate unwanted pressure points on the component 104 that could result in damage to the component 104. Accordingly, in some embodiments, the flexible member 240 is secured to the underside 231 of the cantilever portion 230 by removing a protective covering from the flexible member 240 such that an adhesive layer can adhere to the cantilever portion. Similarly, a protective layer is be removed from the second surface 244 of the flexible member to reveal an adhesive layer configured for adhering to the upper surface 105 of the component 104.

Figure 39A:
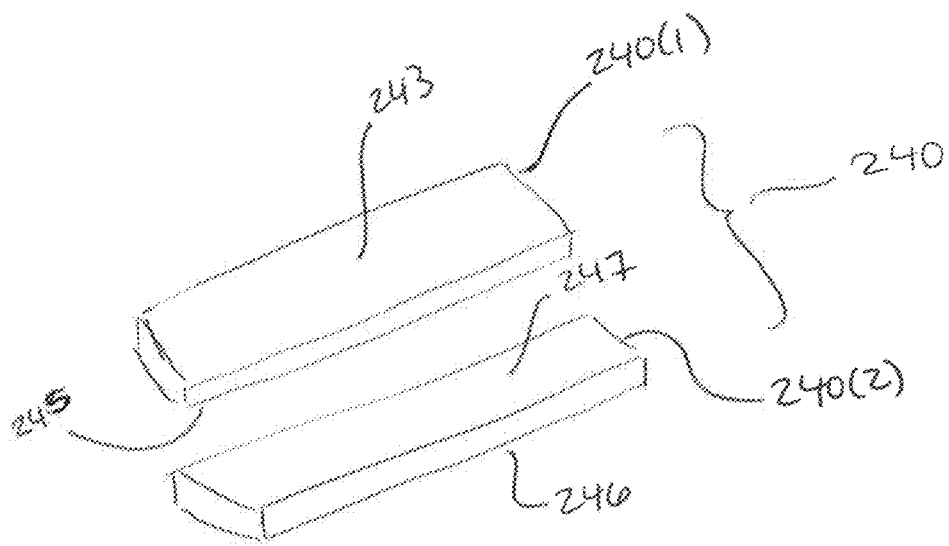
FIG. 39A is a schematic, perspective view of an example embodiment of the flexible member of the anti-theft mounting device according to an example embodiment of the present disclosure.
Figure 39B:
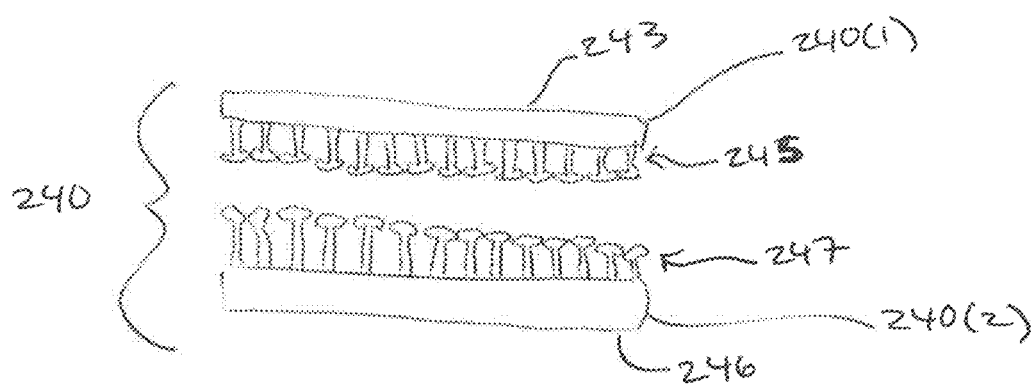
FIG. 39B is a schematic, front view of the flexible member of FIG. 39A.
Figure 39C:
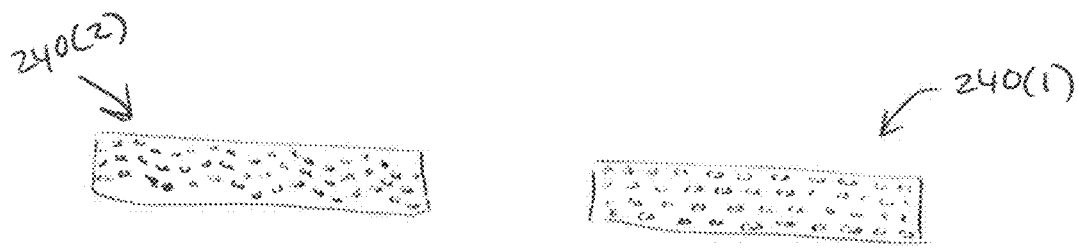
FIG. 39C is a schematic, top view of the substrates that form the flexible member of FIGS. 39A-39B.

In some embodiments, for example, the flexible member 240 includes a first substrate 240(1) and a second substrate 240(2) wherein the first substrate 240(1) includes a first surface 243 for adhering to the underside of the cantilever portion 230 of the component-engager 208 and a second surface 245 configured for releasably connecting to the second substrate 240(2). Similarly, the second substrate 240(2) includes a first surface 246 for adhering to a component, e.g. the upper surface 105 of the component 104 to be secured by the anti-theft mounting device 200, and a second surface 247 configured for releasably connecting to the first substrate 240(1). In some embodiments, the releasable connection between the first substrate 240(1) and the second substrate 240(2) is effected by engagement between a plurality of prong-like members disposed in an array of rows and columns across the second surface 245 of the first substrate 240(1) and a plurality of prong-like members disposed in an array of rows and columns across the second surface 247 of the second substrate 240(2) wherein either the rows, or the columns (depending on the orientation of the second substrate 240(2)) are configured in an undulating or wavy pattern. Accordingly, in some example embodiments, flexible member 240 takes the form of reclosable fastening tape (see FIGS. 39A-39C), with one tape section or first substrate 240(1) secured to the cantilever portion 230 and a corresponding tape section or second substrate 240(2) secured to the back of the secure object 104. As known in the art, reclosable fastening tape can for example take the form of continuous strips of polyolefin stems with a mushroom shaped top protruding up from a backing, with the opposite side of the backing having a conformable acrylic foam adhesive. The polyolefin stems with mushroom shaped tops facing out from surface 245 engage the corresponding stems facing out from the lower surface 247 of the substrate 240(2) on the object 102 to prevent movement of the object 102 parallel to the engagement surface between the first and second substrates 240(1), 240(1). In an example embodiment, in order to enhance the grip between the first and second substrates, the tape strips or substrates used on the opposed surfaces have different stem patterns. For example, the tape strip of substrate used on the component engager 208 could be 3M™ SJ-3551 (which has straight rows of stems) and the tape or substrate used on the component 104 could be 3M™ SJ-3540 (which has stems that extend in rows that are sinusoidal or in a wave-like pattern).

While the first substrate 240(1) has been described as adhering to the cantilever portion 230 with the second substrate 240(2) adhering to the component 104, it will be understood that in some embodiments, the second substrate 240(2) incorporating the undulating rows or columns of prong-like members is adhered to the cantilever portion with the first substrate 240(1) being adhered to the component 104. The releasable coupling between the first substrate 240(1) and the second substrate 240(2) is such that engagement of the prong-like members on the first substrate with the prong-like members on the second substrate in a direction along an axis normal to the surfaces of the substrates 240(1), 240(2) is with effect that relative displacement between the first substrate and the second substrate in a direction transverse to an axis along which the first and second substrates are stacked is prevented, or substantially prevented. Therefore, while the first substrate 240(1) is connected to the component engager 208 and the second substrate 240(2) is connected to the upper surface 105 of the component 104, and once the first substrate 240(1) is releasably coupled to the second substrate 240(2), the component-engager 208 is effectively connected to the component 104. Once the component-engager 208 is connected to the component 104 via the flexible member 240 or the first and second substrates 240(1), 240(2) of the flexible member 240, and once the component-engager 208 is fastened to the mounting surface 106 such that the component 104 is secured to the mounting surface 106, the engagement between the component-engager 208 and component 104 cannot be defeated absent a large amount of force being applied simultaneously in opposite directions to the component engager 208 of the anti-theft mounting device 200 and the component 104. More specifically, in example embodiments, the degree of required force is such that the component 104 will likely be damaged to the extent of being valueless, hence removing an incentive for any unauthorized removal. Furthermore, the adhesive that is used to adhere the flexible member 240 or the first and second substrates 240(2) to the component-engager 208 and the component 104 is also resistant to shear cutting that may be attempted for example by using a thin blade or piano wire slid between the component 104 and the component-engager 208 of the anti-theft mounting device 200, for example, further deterring unauthorized removal of the component 104 from the mounting surface 106. However, as described above, the adhesive is selected so that it can be removed from the surface 105 of the component 104 without damage to the device once the component 104 has been removed from the engagement with the anti-theft mounting device 200 by an authorized user.

In example embodiments wherein the anti-theft mounting device 200 is used for securing an interactive electronic component for display or use, it will be understood that components 104 of this nature generate heat while in use. Therefore, in some embodiments, the flexible member 240 serves to dissipate heat generated by the component 104 so as to prevent heat transfer from the component 104 to the component-engager 208, which in some embodiments, is comprised of metal materials which may conduct heat. By having the flexible member 240 dissipate heat generated by the component 104 so as to prevent the component engager 208 from becoming hot to the touch, the anti-theft mounting device 200 does not interfere with use of the device by a user or present a potential hazard to the user.

As described above, the anti-theft mounting device 200 is fastened to the mounting surface 106 by the at least one fastener 206. In some embodiments, for example, the anti-theft mounting device 200 is connected to the mounting surface 106 via a plurality of fasteners 206, as shown for example, in the example embodiments of FIGS. 2-11, 12-13 wherein two fasteners 206 are used to connect or fasten the anti-theft mounting device 200 to the mounting surface 106, and in the example embodiments shown in FIGS. 14-16 wherein three fasteners 206 are used.

In some embodiments, for example, the fastener 206 (or the plurality of fasteners 206) includes a threaded member 205 extending from a fastener head 207. The fastener 206 is configured for connecting to the first counterpart 202 and to the second counterpart 204 with the threaded member 205 also configured for extending through the corresponding mounting surface 106 such that a portion of the threaded member 205 extends below the bottom surface of the mounting surface 106. The fastener 206 is fastened or otherwise secured to the mounting surface 106 via a corresponding fastening device 211 which, in some embodiments, includes a nut or a wing nut. The first counterpart 202 and the second counterpart 204 are each, independently, configured for cooperating with the fastener 206. In some embodiments, for example, one of the first and second counterparts 202, 204 includes at least one groove 222 for receiving the at least one fastener 206 such that the fastener 206 becomes releasably coupled to the corresponding counterpart 202, 204, while the other one of the first and second counterparts 202, 204 includes at least one corresponding through-opening 224 through which the threaded member 205 extends.

Figure 34:
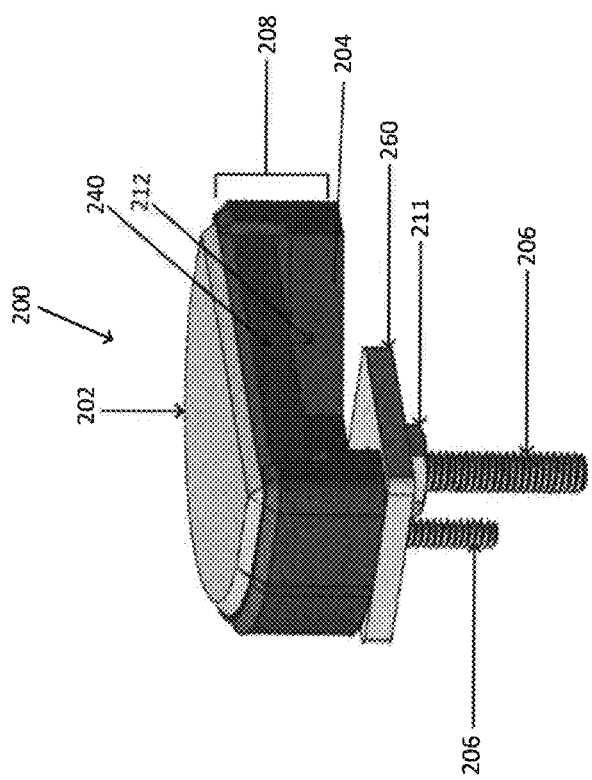
FIG. 34 is a perspective view of an alternate embodiment of the anti-theft mounting device as shown in FIG. 33.
Figure 35:
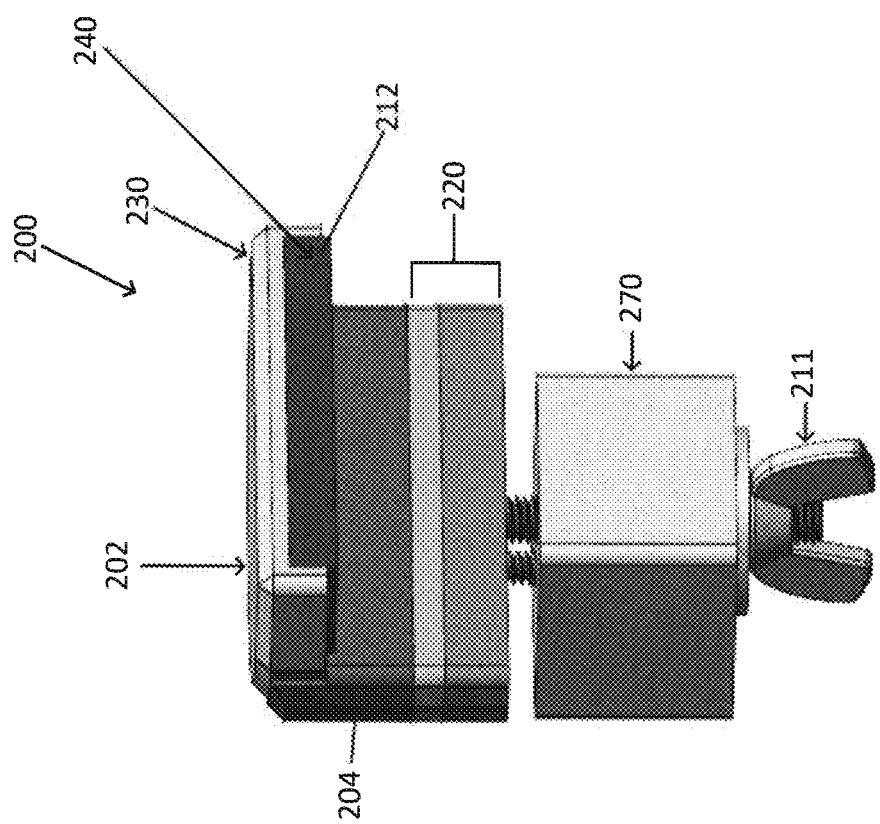
FIG. 35 is a perspective view of an alternate mounting configuration for the example embodiment of the anti-theft mounting device of FIGS. 2-6.

More specifically, referring now to the example embodiment shown in FIG. 14, the first counterpart 202 and the second counterpart 204 are configured for cooperating with three separate fasteners 206. In the subject example embodiment the first counterpart 202 includes three separate grooves or receiving slots 222 each of which is configured for receiving a corresponding fastener 206. Each groove or receiving slot 222 is configured for engaging the fastener head 207 while the threaded member 205 extends through the bottom of the first counterpart 202. In some embodiments, the grooves or receiving slots 222 are configured to resist and/or interfere with rotation of the fastener 206 relative to the first counterpart 202. The second counterpart 204 includes three through-openings 224 that are configured such that while the three fasteners 206 are disposed within the corresponding groove or receiving slot 214 and the first counterpart 202 and the second counterpart 204 are disposed in their connected state, or in their nested configuration, each threaded member 205 extends through the corresponding through-opening 224 in the second counterpart 204 such that the first and second counterpart 202, 204 become connected in their connected state, or nested configuration, with the threaded members 205 extending through the base of the second counterpart 204. Accordingly, in such example embodiment, the fasteners 206 must be connected to the first counterpart 202 prior to the first and second counterparts 202, 204 being connected in their connected configuration to the define the component engager 208. In the subject example embodiment, given that the second counterpart 204 includes recess 214, nesting of the protrusion 216 of the first counterpart 202 in recess 214 is such that the grooves 222 and fastener heads 207 are concealed by the outer wall 250 of the second counterpart 204 that defines the recess 214. By concealing the fasteners 206 within the connected configuration of the anti-theft mounting device 200, tampering with the fastening mechanism is further deterred. In some embodiments, for example, the outer wall 250 of the second counterpart 204 is configured to extend around the front corners of the recess 213 defined by the cantilever portion 230, as shown for example in FIG. 34, such that the edges of the flexible member 240 are partially concealed by the outer wall 250 providing additional security so as to further deter attempts at tampering with the flexible component 240 adhered to the first counterpart 202 and to the component 104 itself.

In other embodiments, for example, the fasteners 206 may extend through corresponding, aligned through-openings 224 formed in both the first counterpart 202 and the second counterpart 204. Accordingly, in some embodiments, the fasteners 206 extend through the first counterpart 202 and the second counterpart 204 from the top down with the threaded members 205 of the fasteners 206 extending through corresponding openings formed in the mounting surface 106 for fastening via the fastening device 211. In other embodiments, the first and second counterparts 202, 204 include tapped or threaded openings configured for securely engaging with corresponding threaded members 205 that are screwed into the component engager 208 defined by the first and second counterparts 202, 204. In some embodiments, the fastener(s) 206 used to secure the first and second counterparts 202, 204 together and to secure the resulting component-engager 208 to the mounting surface 106 are oriented so as to extend from the bottom up through the bottom surface of the mounting surface 106. In some embodiments, a combination of fasteners 206 are used wherein some are oriented to extend from the bottom of the component engager 208 through the mounting surface 106 while others are inserted in the opposite direction and are oriented so as to extend upwards through mounting surface 106 and into the bottom of the component engager 208, as shown for instance in the example embodiment shown in FIG. 20.

Referring now to the example embodiment shown in FIGS. 2-6, another fastening configuration is shown. As illustrated, the anti-theft mounting device 200 includes a first fastener 206(1) which, as described above, is disposed within a corresponding groove or receiving slot 214 formed in the first counterpart 202 such that the threaded member 205 extends downwardly away from the bottom end of the first counterpart 202. The second counterpart 204 includes a recessed or countersunk opening 252 configured for receiving a second fastener 206(2), the second fastener 206(2) being a screw-type fastener for securing the second counterpart 204 to the mounting surface 106. In that respect, the anti-theft mounting device includes an enlarged washer 260 or back-plate that is placed on the underside or bottom surface the mounting plate 106 such that the screw-type fastener 206(2) grips the second counterpart 204 to the enlarged washer 260 as it is screwed through the opening in the mounting plate 106. In order to assist with alignment of the enlarged washer or back-plate 260, the back plate 260 may be provided with a pilot opening 262 for guiding the fastener 206(2) through the washer 260. The second counterpart 204 also includes a through-opening 224 through which the threaded member 205 of the first fastener 206(1) extends. The enlarged washer 260 or back-plate also includes a through-opening 224 through which the treaded member 205 of the first fastener 206(1) extends. The first fastener 206(1) can then be secured or fastened relative to the mounting plate 106 via a wing nut or other fastening device 211 to secure the anti-theft mounting device to the mounting surface 106.

In some embodiments, for example, rather than mounting or fastening the anti-theft mounting device 200 to the mounting surface 106 with a washer, or an enlarged washer plate or back-plate 260, a mounting block 270 having a greater thickness is used so as to accommodate fasteners 260 having longer threaded members 205. The longer threaded members 205 provide a degree of adjustability as additional layers of spacers 220 can be accommodated while still providing sufficient fastening forces for securing the anti-theft mounting device 200 to the mounting surface 106. The thicker mounting blocks 270 can also accommodate alternate fastening configurations wherein both the first and second fasteners 206(1), 206(2) are secured or fastened to the mounting surface via a fastening device 211 such as a wing nut, or nut. See for instance the example embodiments shown in FIGS. 36-38.

In some instances, the fastening of the anti-theft mounting device 200 to the mounting surface 106, exerts a downward force on the component-engager 208, may cause the cantilever portion 230 of the component-engager 208 rotate in an upwards direction (opposite to the direction in which the downwards force is applied). Rotation or displacement of the cantilever portion 230 away from the upper surface of the component 104 is undesirable as it may render the anti-theft mounting device 200 vulnerable to tampering that could lead to unauthorized removal of the component 104. In the subject example embodiments, rotation or displacement of the cantilever portion 230 away from the upper surface of the component 104 is resisted, or substantially resisted, by interference between the first counterpart 202 and the second counterpart 204 by way of their nested, connected configuration. In the example embodiment illustrated in FIGS. 2-6, the resistance or interference to displacement or rotation of the cantilever portion 230 away from the surface of the component 104 is effected by interference between the protrusion 216 and the walls that define the recess 214. In the example embodiment illustrated in FIG. 7-11, rotation or displacement of the cantilever portion 230 away from the upper surface of the component 104 is resisted, or substantially resisted, by interference between the outer wall 250 of the first counterpart 202 that defines the recess 214 and the protrusion 216 of the second counterpart 204.

Referring now to FIGS. 21-25, 26-28 and 29-31, there are shown example embodiments of an anti-theft mounting device 200 configured for engaging a corner portion of the component 104 that is to be secured. As shown, in such instances, the second counterpart 204 is configured to accommodate the corner of the component by defining a component-receiving space 210 defined by converging angled walls on the second counterpart 204, the second counterpart 204 still providing a recess 214 for receiving the corresponding protrusion 216 of the first counterpart 202.

In some embodiments, the anti-theft mounting devices 200 may be distributed and sold as a kit with access to corresponding instructions to secure a component. In some embodiments, the kit may include a plurality of anti-theft mounting devices 200. In some embodiments, for example, the kit may further include a mounting surface 106, wherein the mounting surface 106 is configured for mounting to an independent mounting platform 102. In some embodiments, for example, the kit may include a mounting component 101 such as a hinged box or cabinet configured for mounting to a separate platform 102 or display surface to counter or table, wherein the mounting surface 106 is a hinged door or access panel of the mounting component 101.

While various example embodiments have been described, it will be understood that certain adaptations and modifications of the described embodiments can be made. Therefore, the above discussed embodiments are considered to be illustrative and not restrictive.

What is claimed is:

1. An anti-theft mounting device for securing a component to a mounting surface, comprising:
   a first counterpart;
   a second counterpart; and
   a fastener;
   wherein:
      one of the first counterpart and the second counterpart is a protrusion-defining counterpart and includes a protrusion defined by an outer wall of the protrusion-defining counterpart, and the other one of the first counterpart and the second counterpart is a recess-defining counterpart and includes a recess defined by an outer wall of the recess-defining counterpart, wherein the recess is configured for receiving the protrusion;
      emplacement of the protrusion within the recess is with the effect that the first counterpart and the second counterpart are disposed in a nested configuration wherein the outer wall of the recess-defining counterpart and the outer wall of the protrusion-defining counterpart are disposed in overlapping relationship, and the first counterpart and the second counterpart together define a component-engager;
      while the first counterpart and the second counterpart are disposed in the nested configuration:
         the first counterpart is displaceable relative to the second counterpart such that the component-engager is configured for connection to the mounting surface in, at least, a first state and a second state;
         the component-engager defines a component-receiving space having a height, the component-receiving space defined, in part, by a component-engaging surface defined by at least one of the first counterpart and the second counterpart;
         while the component-engager is in the first state, the first counterpart and the second counterpart are co-operatively configured such that the outer wall of the recess-defining counterpart and the outer wall of the protrusion-defining counterpart are disposed in a first state overlapping relationship wherein the component receiving space has a first height;
         while the component-engager is in the second state, the first counterpart and the second counterpart are co-operatively configured such that the outer wall of the recess-defining counterpart and the outer wall of the protrusion-defining counterpart are disposed in a second state overlapping relationship wherein the component receiving space has a second height, wherein the second height is greater than the first height; and
         transitioning of the component-engager from the first state to the second state is effected by sliding displacement of the protrusion within the recess such that the overlapping relationship of the outer wall of the recess-defining counterpart and the outer wall of the protrusion-defining counterpart transitions from the first state overlapping relationship to the second state overlapping relationship; and connection of the component-engager to the mounting surface via the fastener, while a component is disposed within the component-receiving space, is with the effect that:
    displacement of the first counterpart relative to the second counterpart is prevented.

2. The anti-theft mounting device as claimed in claim 1; wherein:
    while the component-engager is connected to the mounting surface, the height of the component-receiving space is defined by a distance between at least a portion of the component-engaging surface and the mounting surface, as measured along an axis that extends parallel to an axis that is normal to the mounting surface.

3. The anti-theft mounting device as claimed in claim 1; wherein:
    a cantilever portion is defined by one of the first counterpart and the second counterpart, the cantilever portion defining at least a portion of the component-engaging surface; and
    displacement of the first counterpart relative to the second counterpart is along an axis that extends parallel to an axis that is normal to the portion of the component-engaging surface defined by the cantilever portion.

4. The anti-theft mounting device as claimed in claim 3; wherein:
the cantilever portion is defined by the first counterpart, the cantilever portion defining a first component-engaging surface;
the second counterpart defines a bottom edge portion extending from the second counterpart, the bottom edge portion defining a second component engaging surface; and
while the first counterpart and the second counterpart are disposed in the nested configuration such that the first counterpart and the second counterpart together define the component-engager:
    the bottom edge portion is disposed opposite to and spaced apart from the cantilever portion such that the first component-engaging surface is disposed opposite to the second component engaging surface; and
    the height of the component receiving space is defined by the distance between the first component-engaging surface and the second component-engaging surface, as measured along an axis that extends parallel to an axis that is normal to at least one of the first component-engaging surface and the second component-engaging surface.

5. The anti-theft mounting device as claimed in claim 3; wherein:
    connection of the component-engager to the mounting surface via the fastener, while a component is disposed within the component-receiving space, is with the effect that:
    a mounting force is applied to the component-engager, via the fastener, such that the cantilever portion applies a securing force in a first direction to the component disposed within the component-receiving space; and
    rotation of the cantilever portion such that the cantilever portion is displaced away from the component, in a second direction that is opposite to the first direction, in response to application of a removing force applied to the cantilever portion in the second direction, is resisted by interference between at least the protrusion and the recess.

6. The anti-theft mounting device as claimed in claim 3; wherein:
    the component-receiving space is defined by a first component-engaging surface defined by the cantilever portion, and a second component-engaging surface defined by one of the first counterpart and the second counterpart, wherein the second component-engaging surface has a length and extends in a plane that is perpendicular to the first component-engaging surface such that, while the component-engager is connected to the mounting surface via the fastener and a component is disposed within the component-receiving space:
    the first component-engaging surface is disposed in face-to-face contact with a first surface of the component; and
    the second component-engaging surface is disposed parallel to a second surface of the component, that is one of a side edge surface or an end edge surface of the component, relative to the first surface of the component.

7. The anti-theft mounting device as claimed in claim 6; further comprising:
a flexible member;
wherein:
the flexible member is disposed within the component receiving space and configured for adhering to the cantilever portion such that the flexible member defines the first component-engaging surface.

8. The anti-theft mounting device as claimed in claim 7; wherein the flexible member includes:
    a first substrate; and
    a second substrate;
    wherein:
    the first substrate includes a first surface for adhering to the cantilever portion and a second surface configured for connecting to the second substrate;
    the second substrate includes a first surface for adhering to at least a portion of the first surface of the component, and a second surface configured for connecting to the first substrate; and
    connection between the second surface of the first substrate and the second surface of the second substrate is such that relative displacement between the first substrate and the second substrate in a direction transverse to an axis along which the first and second substrates are stacked is prevented.

9. The anti-theft mounting device as claimed in claim 8; wherein:
    while the first substrate of the flexible member is adhered to the cantilever portion and the second substrate of the flexible member is adhered to the component, connection of the component-engager to the mounting surface, via the fastener, while the component is disposed within the component-receiving space, is with the effect that:
    the first substrate and the second substrate are disposed in a connected state; and
    displacement of the component relative to the component-engager in a direction that is parallel to the first substrate and the second substrate is resisted.

10. The anti-theft mounting device as claimed in claim 1; wherein:
the first counterpart defines the protrusion and includes a cantilever portion, the cantilever portion defining at least a portion of the component-engaging surface;
the second counterpart defines the recess and includes a pair of converging angled walls configured for engaging a corner portion of the component; and
emplacement of the protrusion defined by the first counterpart within the recess defined by the second counterpart such that first counterpart and the second counterpart together define the component-engager is with the effect that the component-receiving space is defined by at least the cantilever portion and the pair of converging angled walls and is configured for receiving the corner portion of the component.

11. The anti-theft mounting device as claimed in claim 1; further comprising:
at least one spacer;
wherein:
the at least one spacer is configured for disposition within the recess such that:
while the first counterpart and the second counterpart are disposed in the nested configuration:
the at least one spacer is disposed intermediate the first counterpart and the second counterpart such that an end surface of the protrusion is disposed in abutting contact with an uppermost one of the at least one spacer for supporting the protrusion within the recess while the outer wall of the recess-defining counterpart and the outer wall of the protrusion-defining counterpart are disposed in overlapping relationship.

12. The anti-theft mounting device as claimed in claim 1; further comprising:
at least one spacer;
wherein:
the first counterpart, the second counterpart, the fastener and the at least one spacer are cooperatively configured, such that:
while the first counterpart and the second counterpart are disposed in the nested configuration and the component-engager is established:
the component-engager defines a bottom surface;
the at least one spacer is disposed underneath the component-engager in contact with bottom surface; and
connection of the component-engager to the mounting surface via the fastener, is such that the at least one spacer is disposed intermediate the component-engager and the mounting surface, the height of the component-receiving space being defined by the component-engager and the at least one spacer.

13. The anti-theft mounting device as claimed in claim 1, wherein:
the fastener includes a threaded member.

14. An anti-theft product display system for securely mounting a component to a display, comprising:
a mounting platform with one or more openings extending therethrough; and
at least two anti-theft mounting devices for securing the component to the mounting platform, each anti-theft mounting device of the at least two anti-theft mounting devices comprising:
a first counterpart;
a second counterpart; and
a fastener configured for coupling to the first counterpart and the second counterpart and for insertion through any one of the one or more openings in the mounting platform;
wherein:
one of the first counterpart and the second counterpart is a protrusion-defining counterpart and includes a protrusion defined at least in part by an outer wall of the protrusion-defining counterpart, and the other one of the first counterpart and the second counterpart is a recess-defining counterpart and includes a recess defined by an outer wall of the recess-defining counterpart, wherein the recess is configured for receiving the protrusion;
emplacement of the protrusion within the recess is with the effect that the first counterpart and the second counterpart are disposed in a nested configuration wherein the outer wall of the recess-defining counterpart and the outer wall of the protrusion-defining counterpart are disposed in overlapping relationship, and the first counterpart and the second counterpart together define a component-engager;
while the first counterpart and the second counterpart are disposed in the nested configuration:
the first counterpart is displaceable relative to the second counterpart such that the component-engager is configured for connection to the mounting surface in, at least, a first state and a second state;
the component-engager defines a component-receiving space having a height, the component-receiving space defined, in part, by a component-engaging surface defined by at least one of the first counterpart and the second counterpart; and
while the component-engager is in the first state, the first counterpart and the second counterpart are co-operatively configured such that the outer wall of the recess-defining counterpart and the outer wall of the protrusion-defining counterpart are disposed in a first state overlapping relationship wherein the component receiving space has a first height; and
while the component-engager is in the second state, the first counterpart and the second counterpart are co-operatively configured such that the outer wall of the recess-defining counterpart and the outer wall of the protrusion-defining counterpart are disposed in a second state overlapping relationship wherein the component receiving space has a second height, wherein the second height is greater than the first height; and
transitioning of the component-engager from the first state to the second state is effected by sliding displacement of the protrusion within the recess such that the overlapping relationship of the outer wall of the recess-defining counterpart and the outer wall of the protrusion-defining counterpart transitions from the first state overlapping relationship to the second state overlapping relationship; and
connection of the at least two anti-theft mounting devices to the mounting platform, via the fastener, while a component is disposed within the component-receiving space defined by each of the at least two anti-theft mounting devices, is with the effect that:

the fastener extends through at least a portion of the component engager and through the any one of the one or more openings in the mounting platform;

the component-engager is connected to the mounting platform; and at least a portion the component is disposed intermediate the component-engaging surface defined by the component engager and the mounting platform such that displacement of the component relative to the component engager along the mounting platform is resisted.

15. The anti-theft product display system as claimed in claim 14;
wherein:
each one of the at least two anti-theft mounting devices, independently, is configured for connection to the mounting platform.

16. The anti-theft product display system as claimed in claim 14;
wherein:
the mounting platform is configured for mounting to a display surface.

17. The anti-theft product display system as claimed in claim 14;
wherein:
the mounting platform includes an upper surface of a display counter; and
the one or more openings includes a plurality of openings arranged in an array of rows and columns.

18. The anti-theft product display system as claimed in claim 17;
wherein:
the one or more openings includes one or more of the following alternatives:
mounting holes, mounting slots or a combination of mounting holes and mounting slots.

19. An anti-theft mounting device for securing a component to a mounting surface, comprising:
a first counterpart;
a second counterpart; and
at least one fastener;
wherein:
the first counterpart includes:
a cantilever portion defining a component-engaging surface; and
a protrusion extending perpendicular relative to the cantilever portion, wherein the protrusion is defined at least in part by an outer wall of the first counterpart, the protrusion including at least one fastener-receiving groove defined in the outer wall for receiving the at least one fastener;
the second counterpart includes:
a recess defined by an outer wall of the second counterpart that is configured for receiving the protrusion; and
at least one-through opening extending through a bottom wall of the second counterpart for receiving a corresponding portion of the fastener; and
the first counterpart, the second counterpart and the at least one fastener are cooperatively configured such that:
while the at least one fastener is disposed within the at least one fastener-receiving groove and the protrusion defined by the first counterpart is emplaced within the recess defined by the second counterpart:

the at least one fastener extends from the first counterpart through the at least one-through opening defined by the second counterpart;

the first counterpart and the second counterpart are disposed in a nested configuration wherein the outer wall of the second counterpart and the outer wall of the first counterpart are disposed in overlapping relationship such that the outer wall of the second counterpart overlaps at least a portion of the at least one fastener-receiving groove;

the first counterpart and the second counterpart, together form a component-engager;

the first counterpart is displaceable relative to the second counterpart such that the component-engager is configured for connection to the mounting surface in, at least, a first state and a second state;

the component-engager defines a component-receiving space having a height, the component-receiving space defined, in part, by the component-engaging surface defined by the cantilever portion of the first counterpart;

while the component-engager is in the first state, the first counterpart and the second counterpart are co-operatively configured such that the outer wall of the second counterpart and the outer wall of the first counterpart are disposed in a first state overlapping relationship wherein the component receiving space has a first height;

while the component-engager is in the second state, the first counterpart and the second counterpart are co-operatively configured such that the outer wall of the second counterpart and the outer wall of the first counterpart are disposed in a second state overlapping relationship wherein the component-receiving space has a second height, wherein the second height is greater than the first height; and transitioning of the component-engager from the first state to the second state is effected by sliding displacement of the protrusion within the recess such that the overlapping relationship of the outer wall of the second counterpart and the outer wall of the first counterpart transitions from the first state overlapping relationship to the second state overlapping relationship; and connection of the component-engager to the mounting surface via the at least one fastener, such that the component-engager is disposed on a first side of the mounting surface while a component is disposed within the component-receiving space is with the effect that:

displacement of the of the first counterpart relative to the second access is prevented; and access to the at least one fastener within the at least one fastener-receiving groove is prevented at least in part by the overlapping relationship of the outer wall of the second counterpart with the outer wall of the first counterpart.

20. A kit for an anti-theft product display system, comprising:
a plurality of anti-theft mounting devices, wherein each one of the anti-theft mounting devices, independently, comprises:
a first counterpart;
a second counterpart; and
at least one fastener;
wherein:
one of the first counterpart and the second counterpart is a protrusion-defining counterpart and includes a protrusion defined at least in part by an outer wall of the protrusion-defining counterpart, and the other one of the first counterpart and the second counterpart is a recess-defining counterpart includes a recess defined by an outer wall of the recess-defining counterpart, wherein the recess is configured for receiving the protrusion;
emplacement of the protrusion within the recess is with the effect that the first counterpart and the second counterpart are disposed in a nested configuration wherein the outer wall of the recess-defining counterpart and the outer wall of the protrusion-defining counterpart are disposed in overlapping relationship, and the first counterpart and the second counterpart together define a component-engager;
while the first counterpart and the second counterpart are disposed in the nested configuration:
the first counterpart is displaceable relative to the second counterpart such that the component-engager is configured for connection to the mounting surface in, at least, a first state and a second state;
the component-engager defines a component-receiving space having a height, the component-receiving space defined, in part, by a component-engaging surface defined by at least one of the first counterpart and the second counterpart;
while the component-engager is in the first state, the first counterpart and the second counterpart are co-operatively configured such that the outer wall of the recess-defining counterpart and the outer wall of the protrusion-defining counterpart are disposed in a first state overlapping relationship wherein the component receiving space has a first height;
while the component-engager is in the second state, the first counterpart and the second counterpart are co-operatively configured such that the outer wall of the recess-defining counterpart and the outer wall of the protrusion-defining counterpart are disposed in a second state overlapping relationship wherein the component receiving space has a second height, wherein the second height is greater than the first height; and
transitioning of the component-engager from the first state to the second state is effected by sliding displacement of the protrusion within the recess such that the overlapping relationship of the outer wall of the recess-defining counterpart and the outer wall of the protrusion-defining counterpart transitions from the first state overlapping relationship to the second state overlapping relationship; and
connection of the component-engager to a mounting platform, via the fastener, while a component to be displayed is disposed on the mounting platform such that at least a portion of the component is disposed within the component-receiving space, is with the effect that:
displacement of the first counterpart relative to the second counterpart is prevented; and
displacement of the component-engager, relative to the mounting platform, is prevented.

21. The kit as claimed in claim 20;
further comprising:
the mounting platform, the mounting platform defining a mounting surface;
the mounting platform having one or more openings extending therethrough, the one or more openings configured for cooperating with the at least one fastener of the plurality of anti-theft mounting devices.

22. The kit as claimed in claim 20;
further comprising:
at least one flexible member for each one of the plurality of anti-theft mounting devices;
wherein:
each flexible member of the at least one flexible member includes:
a first substrate; and
a second substrate;
wherein:
the first substrate includes a first surface for adhering to the component-engaging surface and a second surface configured for connecting to the second substrate;
the second substrate includes a first surface for adhering to at least a portion of a first surface of the component, and a second surface configured for connecting to the second surface of the first substrate; and
connection between the second surface of the first substrate and the second surface of the second substrate is such that relative displacement between the first substrate and the second substrate in a direction transverse to an axis along which the first and second substrates are stacked is prevented.

\* \* \* \* \*